United States Patent
Kitchens et al.

[15] 3,681,470
[45] Aug. 1, 1972

[54] ACID ISOMERIZATION OF THUJOPSENE AND NOVEL TRICYCLIC OLERINIC C15 H24 HYDROCARBONS FORMED THEREBY

[72] Inventors: Garry C. Kitchens, Wayne; Alan R. Hochstetler, Bloomfield; Kent Kaiser, Pequannock, all of N.J.

[73] Assignee: Givaudan Corporation, Clifton, N.J.

[22] Filed: Jan. 18, 1971

[21] Appl. No.: 107,498

[52] U.S. Cl..............260/666 PY, 260/586, 252/522
[51] Int. Cl............................C07c 13/30, C07c 13/48
[58] Field of Search.....................260/666 PY, 666 A

[56] References Cited

OTHER PUBLICATIONS

S. Nagahama, Bull. Chem. Soc. Japan 33, p. 1467 (1960)

William G. Dauben et al., Tetrahedron Letters, No. 38, pp. 2675–2678 (1964)

S. Ito et al., 14th Symposium on Chem. Natural Products, Fukuoka, Japan, Oct. 29, 1970

*Primary Examiner*—Delbert E. Gantz
*Assistant Examiner*—Veronica O'Keefe
*Attorney*—Cifelli, Behr and Rhodes

[57] ABSTRACT

Thujopsene and thujopsene isomers derived from hibawood oil and American cedarwood oil when treated with substantially anhydrous protonating acids, suitably in the presence of an alkanoic acid containing from two to six carbon atoms, are isomerized to give a mixture of hydrocarbons including substantial amounts of alpha- and beta- chamigrenes and novel $C_{15}H_{24}$ olefinic hydrocarbons rich in 6,8a-ethano-1,1,6-trimethyl-1,2,3,5,6,7,8,8a-octahydronaphthalene. These products are useful as intermediates in the preparation of compounds valuable in perfume compounding.

10 Claims, No Drawings

ACID ISOMERIZATION OF THUJOPSENE AND NOVEL TRICYCLIC OLERINIC C15 H24 HYDROCARBONS FORMED THEREBY

FIELD OF THE INVENTION

Acid isomerization of thujopsene, novel tricyclic $C_{15}H_{24}$ hydrocarbons formed thereby and separation of $\alpha$-cedrene from the hydrocarbon fraction of cederwood oil.

RELATED APPLICATIONS

1. Our copending application, Ser. No. 107,471 filed concurrently herewith, entitled Acid Iosmerization of Chamigrenes;

2. Our copending application, Ser. No. 107,430 filed concurrently herewith entitled 4-Aceto-6,8a-Ethano-1,1,6-Trimethyl-1,2,3,5,6,7,8,8a-Octahydronaphthalene, Process for Making Same and Compositions Containing Same; and 3. Our copending application, Ser. No. 107,472 filed concurrently herewith entitled Process for Acetylation of Chamigrenes.

DESCRIPTION OF THE PRIOR ART

Perfume materials derived by the acetylation of the hydrocarbon fractions of cedarwood oil have been manufactured for over 15 years and sold under various trade names. The earlier products were derived by acetylating the hydrocarbons with acetic anhydride or acetyl chloride and catalysts such as aluminum chloride, zinc chloride or boron trifluorode. These products were essentially derived from the more stable $\alpha$-cedrene (I) in the hydrocarbon fractions and were essentially acetylcedrene (II).

In recent years a perfume product has been manufactured by applying an acetylation procedure employing acetic anhydride and polyphosphoric acid to the hydrocarbon functions of American cedarwood oil containing 40–50 percent $\alpha$-cedrene (I), 5–10 percent $\beta$-cedrene (III), 40–50 percent cis-thujopsene (IV), (J. Runeberg, Acta. Chem. Scand., 15, 592 (1961)), 5–10 percent thujopsene isomers (G. Kitchens, J. Dorsky and K. Kaiser, A.C.S. Symposium on the Chemistry of Essential Oils. A.C.S. Meeting, New York, September 9, 1969).

The known procedures for the isomerization of thujopsene (IV) with aqueous sulfuric acid (J. Tanaka and I. Yamashita, Bull, Osaka Ind. Research Inst., 9, 5 (1958)) (L. E. Friedrich, Dissertation, 1966, University Microfilms, Inc. Ann Arbor, Michigan No. 67–8559 p. 156) aqueous perchloric acid and dioxane (L.E. Friedrich, Dissertation, 1966, University Microfilms, Inc., Ann Arbor, Michigan No. 67–8559, p. 128) have been shown to yield mainly a hydrocarbon, 1,4,11,11-tetramethylbicyclo [5.4.0] undeca-3,7-diene (L.E. Friedrich, Dissertation, 1966, University Microfilms, Inc., Ann Arbor, Michigan, No. 67–8559, p. 128) (X), which can be further isomerized with a catalytic amount of perchloric acid in acetic acid (L.E. Friedrich, Dissertation, 1966, University Microfilms, Inc, Ann Arbor, Michigan, No. 67–8559 p. 51, 110–112) to the tricyclic hydrocarbon, 2,2,3,7-tetramethyltricyclo [$5.2.2.0^{1,6}$] undec-3-ene (XI).

S. Ito (S. Ito, K. Endo, T. Yoshida, M. Yatagai and M. Kodama, Chem. Comm. 168(1967)) states "$\beta$-chamigrene (VII) was isolated as one of the major products from the hydrocarbon mixture either by the isomerization with oxalic acid or by the acid-catalyzed dehydration of widdrol." The references cited are Nagahama (S. Nagahama, Bull, Chem. Soc. Japan, 33, 1467 (1960)) and Dauben and Friedrich (W. G. Dauben and L. E. Friedrich, Tetrahedron Letters No. 38, 2675 (1964)). The authors cited above do not reveal the formation of $\beta$-chamigrene (VII) by the isomerization of thujopsene (IV).

SUMMARY OF THE INVENTION

There is provided a novel method for isomerizing thujopsene and thujopsene isomers derived from hibawood oil and American cedarwood oil, to give chamigrenes and novel tricyclic $C_{15}H_{24}$ oilefinic hydrocarbons. In a further embodiment of this invention, a similar procedure may be utilized to treat the hydrocarbon fractions of cedarwood oil in order to facilitate the separation therefrom of $\alpha$-cedrene.

DESCRIPTION OF PREFERRED EMBODIMENTS

We have established in our laboratories that the aforementioned acetylated product derived from cedarwood oil hydrocarbons contains principally 40–55 percent acetylcedrene (II) derived from $\alpha$- and $\beta$-cedrene and 40–50 percent acetylated $C_{15}H_{24}$ hydrocarbons derived from thujopsene and thujopsene isomers. It has been further established by us that the portion of the product derived from the thujopsene-thujopsene isomers contains 7 isomeric $C_{15}H_{24}COCH_3$ ketones. Six (22–26 percent) of these ketones, designated as isomers A, B, C, D, E, F, possess very weak woody odors and are not of practical interest in perfumery while the seventh ketone (18–24 percent), 4-aceto-6,8a-ethano-1,1,6-trimethyl-1,2,3,5,6,7,8,8a-octahydronaphthalene (V) designated as isomer G, is a new and novel compound possessing a powerful and valuable musk odor.

The reaction may be schematically represented as follows:

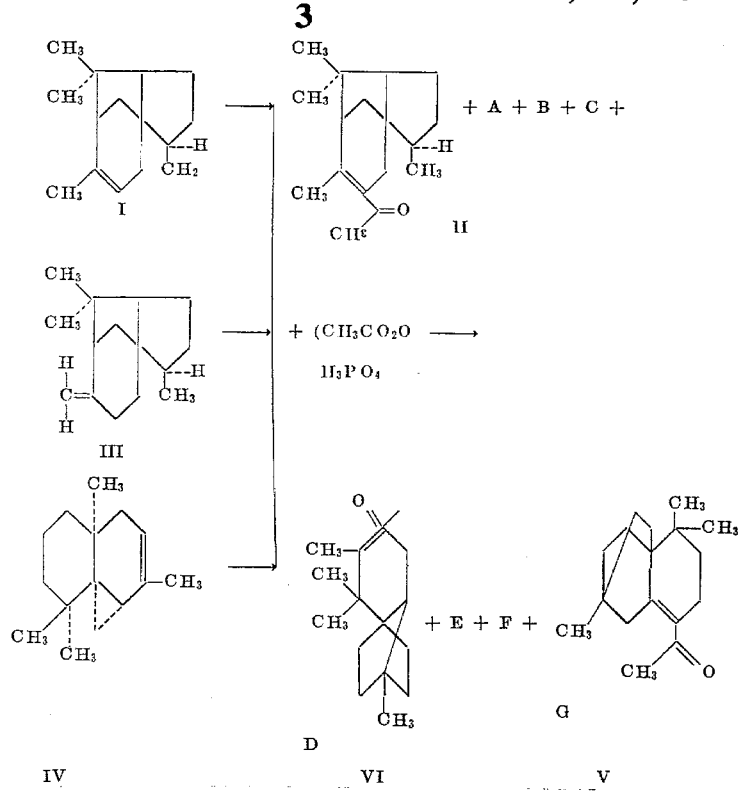

The structure of isomer D above was established as 4-aceto-2,2,3,7-tetramethyltricyclo [5.2.2.0$^{1,6}$] undec-3-ene (VI) by comparison with an authentic sample prepared from the hydrocarbon 2,2,3,7-tetramethyl-tricyclo[5.2.2.0$^{1,6}$] undec-3-ene (L. E. Friedrich, Dissertation, 1966, University Microfilms, Inc., Ann Arbor, Michigan, No.67–8559, p.160) (XI).

This invention is also concerned with method for the preparation of pure 4-aceto-6,8a-ethano-1,1,6-trimethyl-1,2,3,5,6,7,8,8a-octahydronaphthalene (V, isomer G) and mixtures, rich in this ketone (V) and free of acetylcedrene (II) and mixtures with acetylcedrene (II) containing 40 percent of more of the desired ketone (V) from thujopsene (IV) derived from naturally occurring essential oils as hibawood and cedarwood oils, β-chamigrene (VII), α-chamigrene (VIII) and thujopsene isomers rich in the hydrocarbon, 6,8a-ethano-1,1,61,2,3,5,6,7,8,8a-octahydronaphthalene (IX). The ketones derived by the acetylation of thujopsene (IV), chamigrenes (VII and VIII) or the tricyclic hydrocarbons (IX) are seven isomeric C$_{17}$H$_{26}$O ketones and are designated again as isomers A to G.

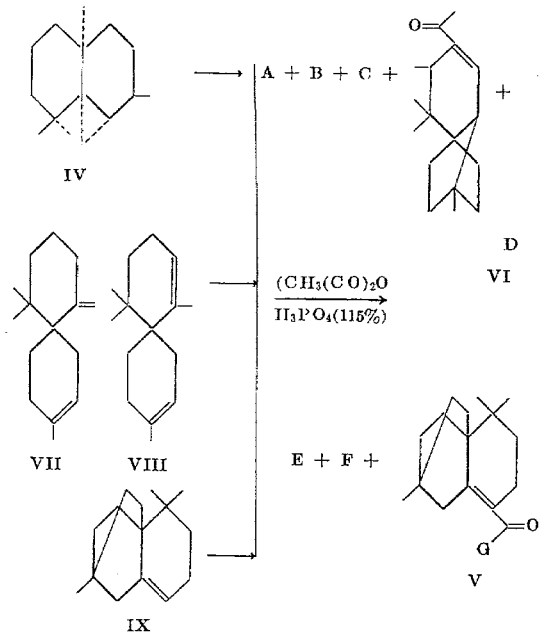

This invention is also concerned with novel isomerization procedures utilizing protonating acids whereby thujopsene (IV) can be isomerized to β-chamigrene (VII) and α-chamigrene (VIII) or to a new series of tricyclic $C_{15}H_{24}$ olefinic hydrocarbons rich in the hydrocarbon 6,8a-ethano-1,1,6-trimethyl-1,2,3,5,6,7,8,8a-octahydronaphthalene (IX). The chamigrenes VII and VIII also can be isomerized by these novel procedures to the new series of tricyclic $C_{15}H_{24}$ olefinic hydrocarbons (IX).

We have found unexpectedly that strong acids isomerize thujopsene (V IV) by Path A to α- and β-chamigrenes (VIII and VII) which in turn can be isomerized to a new series of tricyclic $C_{15}H_{24}$ olefinic hydrocarbons, rich in the hydrocarbon, 6,8a-ethano-1,1,6-trimethyl-1,2,3,5,6,7,8,8a-octahydronaphthalene (IX), which we designate as hydrocarbons A and B, while weak or dilute aqueous acids follow a different isomerization (Path B) to yield the hydrocarbon, 1,4,11,11-tetramethylbicyclo[5.4.0]undeca-3,7-diene (X) (L. E. Friedrich, Dissertation, 1966, University Microfilms, Inc., Ann Arbor, Michigan, No. 67–8559, p. 128) which can be further isomerized to the hydrocarbon 2,2,3,7-tetramethyl-tricyclo[5.2.2.0$^{1,6}$]undec-3-ene (XI) (L. E. Freidrich, Dissertation, 1966, University Microfilms, Inc., Ann Arbor, Michigan, No. 67–8559, p. 51, 160).

Our invention concerns novel procedures using strong acids, such as formic acid or a mixture of acetic acid and such acids as oxalic, sulfuric, phosphoric, polyphosphoric, toluenesulfonic and perchloric acids to yield the hydrocarbons of Path A as the major products of the reaction. The tricyclic hydrocarbons of Path A are new and valuable raw materials for conversion to valuable perfume materials.

Another object of this invention is a novel method for the separation of the hydrocarbons from cedarwood oils. There is no known chemical method for the separation of the cedrenes from thujopsene in cedarwood hydrocarbon fractions. The separation by distillation is extremely difficult and uneconomical due to close boiling points. By applying our novel isomerization to cedarwood hydrocarbons containing 40–50 percent α-cedrene (I), 5–10 percent β-cedrene (III), 40–50 percent cis-thujopsene (IV), 5–10 percent thujopsene isomers, the α-cedrene (I) remains un-altered while β-cedrene (III) is isomerized to α-cedrene (I) and thujopsene (IV) is isomerized either to the chamigrenes (VII and VIII) or the new tricyclic series of hydrocarbons A and B (IX). The α-cedrene (I) is now easily separated by distillation in high purity from the chamigrenes or tricyclic hydrocarbons since the latter have higher boiling points.

Path A

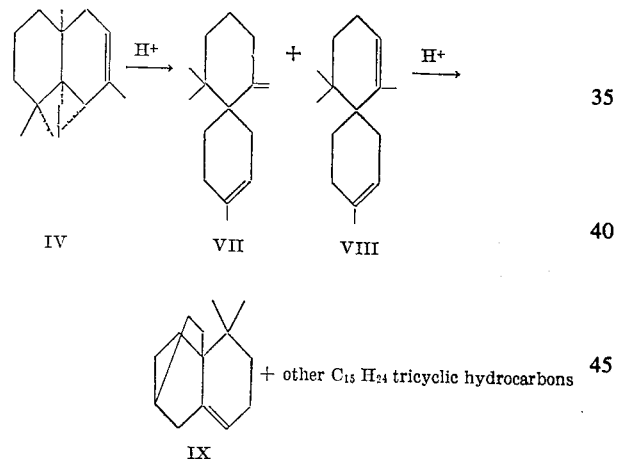

Path B (hydrocarbons A and B)

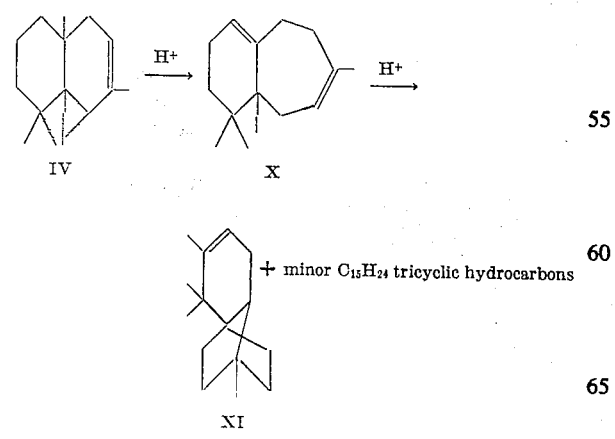

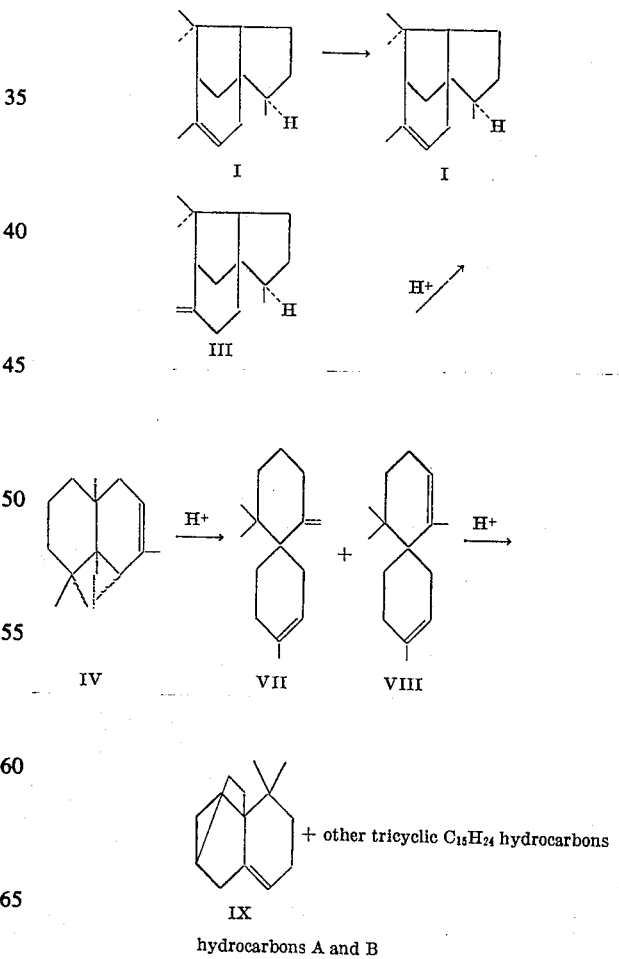

This invention relates to the preparation of the pure ketone, 4-aceto-6,8a-ethano-1,1,6-trimethyl-1,2,3,5,6,7,8,8a-octahydronaphthalene (V), (isomer G), mixtures rich in ketone (V) and free of acetylcedrene (II) and mixtures with acetylcedrene (II) containing 40 percent or more of the ketone (V), from thujopsene (IV) (derived from thujopsene containing essential oils (T. Norin, Acta Chem. Scand., 15, 1667 (1961) such as hibawood oil and American cedarwood oil), and from the thujopsene isomers, α-chamigrene (VIII), β-chamigrene (VII) and tricyclic $C_{15}H_{24}$ hydrocarbons A and B rich in the hydrocarbon 6,8a-ethano-1,1,6-trimethyl-1,2,3,5,6,7,8,8a-octahydronaphthalene (IX). This invention is also concerned with novel isomerization procedures for isomerizing thujopsene (IV) to β- and α-chamigrenes (VII and VIII) and to tricyclic $C_{15}H_{24}$ olefinic hydrocarbons A and B rich in the tricyclic olefinic hydrocarbon 6,8a-ethano-1,1,6-trimethyl-1,2,3,5,6,7,8,8A-octahydronaphthalene (IX).

One method for the preparation of the ketone (V) involves the acetylation of thujopsene (IV) using acetic anhydride and polyphosphoric acid (115%) to yield a mixture of isomeric $C_{17}H_{26}O$ ketones A, B, C, D (VI), E, F and G (V), rich in the ketone (V) (isomer G).

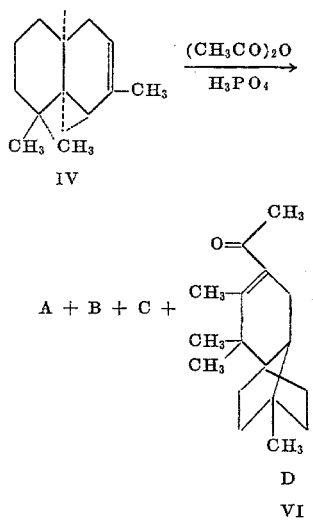

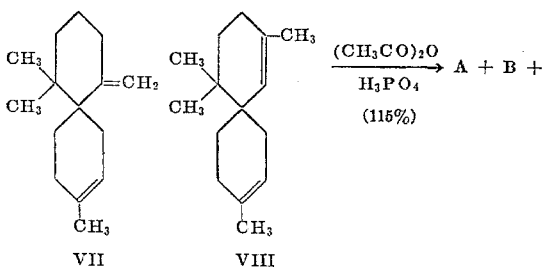

A second method for the preparation of ketone (V) (isomer G) involves the acetylation of β- and α-chamigrenes (VII and VIII) (derived by the formic acid isomerization of thujopsene) using acetic anhydride and polyphosphoric acid to also yield a mixture of isomeric $C_{17}H_{26}O$ ketones A, B, C, D (VI), E, F and G (V), rich in the desired ketone (V) (isomer G).

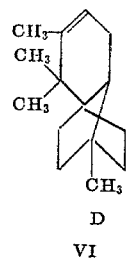 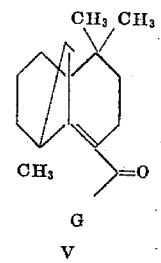

D      G
VI      V

A third method for the preparation of the ketone (V) involves the acetylation of tricyclic $C_{15}H_{24}$ olefinic hydrocarbons A and B rich in the hydrocarbon (IX), (derived by the isomerization of thujopsene with a mixture of polyphosphoric acid and acetic acid) using acetic anhydride and polyphosphoric acid to yield a mixture of isomeric ketones A, B, C, D (VI), E, F and G (V) rich in the desired ketone (V) (isomer G).

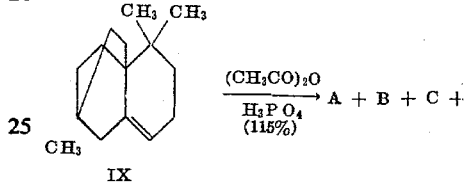

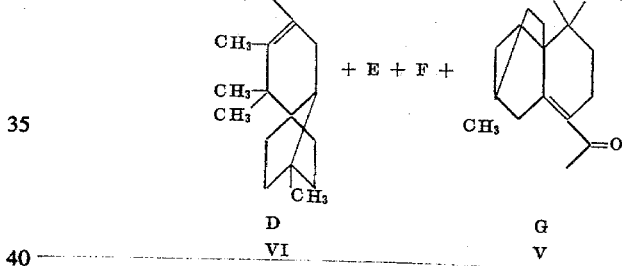

The reactions conditions for the above acetylations are not critical. The acetic anhydride can be varied between 1.0 and 10.0 moles per mole of hydrocarbon. We prefer to use 2.0–4.0 moles of acetic anhydride per mole of the hydrocarbon.

The polyphosphoric acid (115% $H_3PO_4$) can be widely varied from 1.0–5.0 moles calculated as $P_2O_5$ per mole of hydrocarbon. We prefer to use 1.4–2.82 moles (as $P_2O_5$) per mole of hydrocarbon.

The reaction can be conducted at a temperature of 10° to 100°C. At low temperatures the reaction mixture is viscous and agitation is difficult. At high temperatures the yields are low and undesirable byproducts are formed. We prefer to conduct the reaction between 25° to 50°C.

The reaction can be conducted with or without solvents. Solvents such as acetic acid, chloroform, carbon tetrachloride, ethylene dichloride, methylene dichloride, cyclohexane, hexane, heptane, benzene and toluene can be used. If a solvent is used, we prefer to use ethylene dichloride or methylene dichloride in the amount of 0.5 to 1.5 times the weight of the hydrocarbon.

In the above third method for preparation of the ketone (V) (isomer G) the acetylation can be accomplished by the use of acetic anhydride and boron trifluoride catalyst instead of polyphosphoric acid catalyst. The conditions for this reaction are the same as the above acetic anhydride-polyphosphoric acid reaction except a molar excess of boron trifluoride per mole of hydrocarbon is required for complete conversion. We prefer to use 1.1–1.25 moles of $BF_3$ per mole of the hydrocarbon.

The novel isomerization of this invention involves the isomerization of thujopsene (IV) with strong concentrated protonating acids to form as the major products β-chamigrene (VII) and α-chamigrene (VIII) or a new series of tricyclic $C_{15}H_{24}$ olefins, hydrocarbons A and B, rich in 6,8a-ethano-1, 1,6-trimethyl-1,2,3,5,6,7,8,8a-octahydronaphthalene (IX) (Path A) rather than the hydrocarbons 1,4,11,11-tetramethyl-bicyclo[5.4.0] undeca-3,7-diene (X) or 2,2,3,7-tetramethyl-tricyclo[5.2.2.0$^{1,6}$]undec-3-ene (XI) (Path B).

Path A

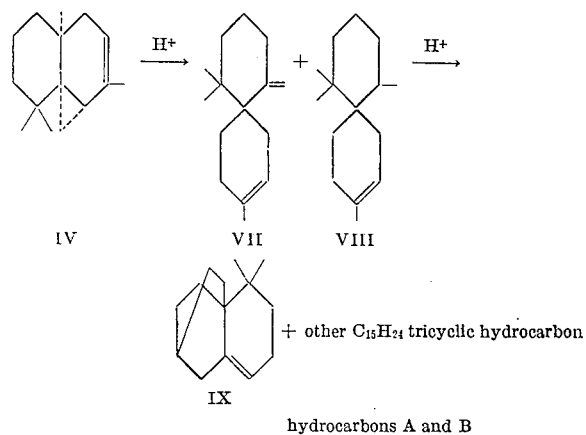

Path B

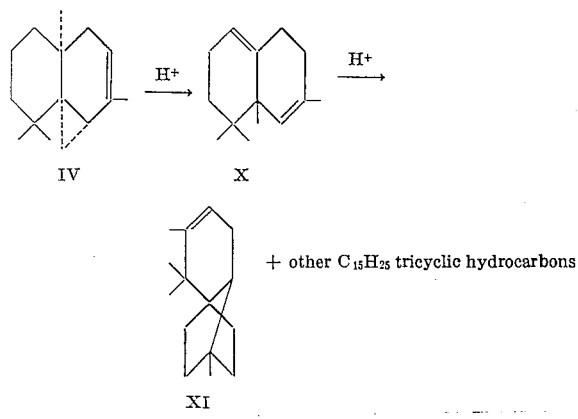

The tricyclic $C_{15}H_{24}$ hydrocarbons of Path A are new compounds and are valuable intermediates in the preparation of novel perfume materials while the tricyclic hydrocarbons of Path B are known (L. E. Friedrich, Dissertation 1966, University Microfilms, Inc., Ann Arbor Michigan, No. 67-8559, p.51, 169) and are not intermediates for perfume materials.

We have found that strong concentrated protonating acids (with a pKa of 4.0 or smaller) such as formic, sulfuric, phosphoric, polyphosphoric, toluenesulfonic, and perchloric acids favor the isomerization of thujopsene (IV) by Path A B. We have also found that the isomerization by Path A is further favored by the use of mixtures of acetic acid and strong acids as oxalic and the above mentioned strong acids. Other alkanoic organic acids, RCOOH, where R is an alkyl group containing one to five carbon atoms can be used in place of the acetic acid, however we prefer to use acetic acid.

The isomerizations can be conducted in the presence of solvents such as methylene dichloride, ethylene dichloride, carbon tetrachloride, chloroform, ether and dioxane, however, we prefer not to use solvents. The product of the isomerization by Path A depends on the acid, acid concentration, temperature and reaction time. Thus by the selection of the proper acid and conditions either the chamigrenes (VII and VIII) or the tricyclic hydrocarbons A and B of Path A, or a mixture of these hydrocarbons can be obtained as the major products of the isomerization.

In general, concentrated acids containing 50% or less water can be used for the isomerizations, however, the more concentrated acids of 85–100 percent concentration are more favorable to yield the hydrocarbons of Path A.

In general, for the isomerization of the thujopsene (IV) to predominately form the chamigrenes (VII and VIII) strong acids, or a mixture of acetic acid and strong acids with a pKa of 2–4, can be used. For the isomerization of thujopsene (IV) or the chamigrenes (VII and VIII) to the tricyclic hydrocarbons (IX) of Path A stronger acids with a pKa of 0.85 or less are required. Intermediate acid strengths give a greater mixture of chamigrenes and tricyclic hydrocarbons.

In general, the quantity of acids used in the isomerization is different for each acid used, there being a lower limit whereby the isomerization does not occur or does not go to completion due to the reaction of the catalyst with the hydrocarbon. These limits can be established only by experimental data. In some cases the use of large excess quantities of isomerization acids leads to low yields as a result of side reactions.

For the isomerization of thujopsene (IV) to the chamigrenes (VII and VIII) we prefer to use formic acid or a mixture of acetic acid and formic, oxalic, phosphoric or polyphosphoric acids.

Various concentrations of formic acid (50–100 percent) can be used, however, to avoid undesirable side reactions we prefer to use 90–100 percent formic acid. The amount of formic acid is not too critical, 3–100 percent by weight based on the weight of thujopsene (IV) or even greater quantities which are not economically feasible can be used. We prefer to use 10–20 percent by weight of 90-98 percent formic acid based on the weight of thujopsene (IV).

The temperature of the reaction is not critical and can be carried out in the range of 40°–150°C. At the lower temperatures the reaction is slow, while above 100°C pressure vessels must be used and undesirable side reactions occur. We prefer to use a temperature of 90°–100°C. The isomerization is usually complete within one-half to 3 hours.

In the isomerization of thujopsene (IV) to chamigrenes (VII and VIII) using mixtures of acetic acid and formic acid, mixtures containing 20 mole percent or more formic acid can be used. We prefer to use a mixture containing 40 to 60 mole percent of formic acid. The quantity of the acid mixture is not too critical; however, we prefer to use 20 to 50 percent by weight of the acid mixture based on the weight of the thujopsene (IV). The isomerization can be carried out in a temperature range of 40°–150°C. We prefer to conduct the isomerization between 90°–100°C. The isomerization under the preferred condition is usually complete in 3 to 4 hours.

For the isomerization of thujopsene (IV) to the chamigrenes (VII and VIII) neither acetic acid nor oxalic acid are suitable catalysts for the isomerization; however, mixtures of oxalic and acetic acid are good catalysts. The conditions for the isomerization using mixtures of oxalic and acetic acids are very critical. Mixtures containing 4.0 to 10 mole percent oxalic acid can be used. We prefer to use mixtures containing 4.5 to 6 mole percent of oxalic acid. The amount of the acid mixture used can be widely varied from 5 to 100 percent by weight based on the thujopsene (IV); however, to achieve the highest yields we prefer to use 10 to 20 percent by weight based on the thujopsene (IV). The reaction can be conducted between 50° and 150°C. We prefer to carry out the reaction at 90°–100°C. The reaction is complete in 3 to 4 hours using the preferred conditions.

In general, for the isomerization of thujopsene (IV) to the chamigrenes (VII AND VIII) using very strong acids such as phosphoric acid, polyphosphoric acid, sulfuric acid, and perchloric acid, mixtures of acetic and these acids can be used. The concentration of the acetic acid mixtures is very important because at high concentrations of these acid mixtures the chamigrenes (VII and VIII) can be further converted to the tricyclic hydrocarbons A and B (IX) of Path A. In general, the acetic acid mixtures containing an acid having a pKa of about 2.0 or larger can be used. Acetic acid, mixtures of these strong acids containing 0.1 to 6.0 mole percent of the strong acids and isomerization temperatures of 10° to 120°C can be used.

For the strong acid isomerizations, we prefer to use an acetic acid-polyphosphoric acid mixture containing 0.7 to 5.5 mole percent of polyphosphoric acid and a temperature of 30° to 60°C. The amount of the mixed acid used for the isomerization can be widely varied from 10 to 200 percent by weight based on the thujopsene (IV), with 100 to 150 percent being the preferred amounts. The isomerizations under the preferred conditions are usually complete in 3 to 6 hours.

For the complete isomerization of thujopsene (IV) to the tricyclic hydrocarbons A and B (IX) of Path A mixtures of acetic acid and strong acids as phosphoric acid (100 percent), polyphosphoric acid, sulfuric acid and perchloric acid with a pKa of about 0.85 or smaller are required. For the greatest selectivity we prefer to use acetic acid mixtures of polyphosphoric acid. Acetic acid mixtures containing 5.5 to 50 mole percent of polyphosphoric acid can be used. The preferred acetic acid mixture is 10 to 30 mole percent of polyphosphoric acid. An isomerization temperature of 20 to 60°C can be used; however, a temperature of 40° to 50°C is preferred. The amount of isomerizing acid can be widely varied, 10–500 percent by weight based on the thujopsene (IV); however, a 50–150 percent by weight is preferred. The isomerization is usually complete in 3 to 6 hours using the preferred conditions.

For the isomerizations of the chamigrenes (VII and VIII) to the tricyclic hydrocarbons A and B (IX) we prefer to use mixtures of acetic acid and polyphosphoric acid under the same conditions as above for thujopsene (IV).

In the isomerization of the chamigrenes (VII and VIII), mixtures of acetic, and other strong acids, such as sulfuric and perchloric acids can be used instead of the acetic and polyphosphoric acid mixture. The conditions are approximately the same as for the latter acid mixtures.

In the application of our above novel isomerization procedures to the hydrocarbon portions of cedarwood oil, $\alpha$-cedrene (I) is unaltered; $\beta$-cedrene (III) is isomerized to $\alpha$-cedrene (I), thujopsene (IV) is isomerized to either the chamigrenes (VII and VIII) or the new tricyclic hydrocarbons A and B (IX). The constituents are now easily and economically separated by vacuum distillation. The chamigrenes (VII and VIII) and tricyclic hydrocarbons A and B, rich in 6,8a-ethano-1,1,6-trimethyl-1,2,3,5,6,7,8,8a-octahydronaphthalene (IX), are valuable raw materials for the preparation of our novel 4-aceto-6,8a-ethano-1,1,6-trimethyl-1,2,3,5,6,7,8,8a-octahydronaphthalene (isomer G), (V) of this invention. The isomerization conditions are identical to those above for isomerizing thujopsene (IV) to either the chamigrenes (VII and VIII) or to the tricyclic olefin hydrocarbons A and B (IX).

4-Aceto-6,8a-ethano-1,1,6-trimethyl-1,2,3,5,6,7,8,8a-octahydronaphthlene (V), (isomer G), possesses a very intense amber, woody and musk odor. The material with its amber-like note is reminiscent of ambergris but more tenacious and sweeter. Isomer G (V) when compared in strength and tenacity with ambergris is found to be approximately three times stronger than ambergris and to last ten times longer. Isomer G (V), besides contributing unique odor characteristics to perfume compositions, has unusual fixative properties which may be compared to ambergris, a long established and superb fixative.

Mixtures of isomer G (V) and the other isomeric ketones, isomers A–F, derived from the thujopsene (IV) and mixtures of isomer G (V), isomers A-F and acetylcedrene (II) derived from thujopsene (IV) and cedrene (I) which contain 40 percent or more of isomer G (V) exhibit the above unique olfactory and fixative properties. In mixtures where the concentration of isomer G (V) is below 40 percent, the olfactory and fixative properties drop off rapidly and its full potential as odorant and a fixative is not fully realized.

Isomer G (V) and the mixtures above containing 40 percent or more of isomer G (V) are fine odorants and fixatives which improve and render more desirable many types of fragrances. These materials can be used in the same manner as ambergris in formulations for amber notes and fixative properties.

EXAMPLES

Instrumentation in the following examples is as follows:

A. Vapor phase chromatography (vpc)
   A-1. 150°C, 60ml/min, 15 percent carbowax 20M on chromosorb P, 1/4 inch dia., 2 meter copper column.
   A-2. 225°C, 60 ml/min., 15 percent carbowax 20M on chromosorb P. 1/4 inch dia., 2 meter copper column.

A-3. 150°C, 40 psi, S.C.O.T. (support coated open tubular) 3 percent carbowax, 0.02 inch dia., 50 feet stainless steel column purchased from Perkin-Elmer Corp., Norwalk, Conn.

A-4. 90°–180°C, 6–8 ml/min, program 2,8°C/min., SCOT (supported coated open tubular), 3 percent carbowax 20M, 0.02 inch dia., 50 feet stainless steel column purchased from Perkin-Elmer Corp., Norwalk, Conn.

B. Vpc/mass spectrum

Perkin-Elmer 900, SCOT 3 percent carbowax 20M, 0.02 inch. dia., 50 ft. stainless steel column/Perkin-Elmer 270 (double focusing) on-line to a Varian 620/i.

C. Infrared absorption (ir)

Perkin-Elmer 457

D. Nuclear magnetic resonance (nmr)

Varian A60A

E. Nester/Faust NFA-100 auto annular teflon spinning band distillation column purchased from Nester/Faust Manufacturing Corp., Newark, Delaware.

EXAMPLE 1

Tricyclic $C_{15}H_{24}$ Hydrocarbons Rich in 6,8a-Ethano-1,1,6-Trimethyl-1,2,3,5,6,7,8,8a-Octahydronaphthalene (IX)

Into a reaction flask, equipped with an agitator, thermometer, feeding funnel and a condenser, is charged 500 g. glacial acetic acid and 200 g. polyphosphoric acid (115 percent). The mixture is agitated and 500 g. thujopsene (IV) is fed in at 40°C over a 5 minute period. The batch is agitated at 40°C for 3 hours and poured onto 1000 g. water. The oil layer is separated and the aqueous layer extracted 2 × 100 ml benzene. The combined oil and benzene extracts are washed 2 × 50 ml water, made alkaline with 10 percent sodium carbonate and washed neutral with salt water. The benzene is distilled off under reduced pressure leaving 505 g. crude hydrocarbons. Vpc (A-1) of the crude shows eight components: (1) 0.4%, (2) 1.3%, (3) 4.7%, (4) 4.9%, (5) 9.3%, (6) 27.3%, (7) 44.5%, (8) 7.5%. Components 1–4 are tricyclic $C_{15}H_{24}$ hydrocarbons of unknown structure. Component 5 is 2,2,3,7-tetramethyltricyclo[5.2.2.0$^{1,6}$]undec-3-ene (XI). Components 6 and 7 are the desired tricyclic $C_{15}H_{24}$ hydrocarbons and are referred to as hydrocarbons A and hydrocarbons B (IX). Component 8 is chamigrenes (VII and VIII), principally α-chamigrene (VIII).

The crude is vacuum distilled at 0.5mm using a 2 ft., 25mm diameter Goodloe packed column (rated 14 theoretical plates) and a reflux ratio of 20:1 and the following fractions are collected:

1. 660 g; b.p. 51°–65°C/0.5mm; $n_D^{20}$ 1.4980; vpc (A-1) : 8.2 percent hydrocarbon A; 3.2 percent hydrocarbon B.
2. 85.5 g; b.p. 65°–66°C/0.5mm: $n_D^{20}$ 1.5045; vpc (A-1) : 35.4 percent hydrocarbon A, 21.6 percent hydrocarbon B.
3. 262.4 g; b.p. 66°–76°C/0.5mm; $n_D^{20}$ 1.5075; Sp. Gr. 25°C/25°C 0.9442; vpc (A-1) : 32.9 percent hydrocarbon A; 59.7 percent hydrocarbon G B; 3.3%α-chamigrene (VIII).
4. 32.0 g; b.p. 76°–89°C/0.5mm; $n_D^{20}$ 1.5150; vpc (A-1): 24.6 percent hydrocarbon B, 47.2 percent α-chamigrene (VIII), 28.4 percent esters (formates).
5. 10.5 g; b.p. 89–90/0.5mm; $n_D^{20}$ 1.15184; vpc (A-1): 10.6 percent α-chamigrene (VIII), 89.4 percent formates.
6. 35.1 g. residue.

The redistillation of fractions 1,2 and 4 will give more material similar to fraction 3, the desired products of the reaction.

Samples of hydrocarbons A and B are prepared from fraction 2 above by vacuum distillation at 5mm using a Nester/Faust column (E) and preparative vapor phase chromatography. The following is analytical data for the hydrocarbons:

Hydrocarbons A

Calcd. for $C_{15}H_{24}$: C, 88.16%; H, 11.8%

Found: C, 88.24%; H, 11.81%

Mass spectrum (B): 204 mol.wt. (31%), 189 (27%) 175 (100%), 161 (8%), 148 (18%), 147 (13%), 133 (20%), 119 (35%), 105 (39%), 95 (20%), 93 (16%) 91 (24%), 81 (18%), 79 (17%), 77 (15%), 69 (8%), 67 (11%), 65 (7%), 55 (16%), 53 (10%), 43 (7%), 41 (33%).

Nmr (D) (τ, CDCl$_3$): centered at 4.75 (1H, broad, ½H = 10Hz, multiplet, vinylic), centered at 7.93 (2H, multiplet, allylic), centered at 8.08 (2H, multiplet, allylic), 8.25–8.92 (10H, multiplet, methylene), 9.00 (3H, singlet, methyl H); 9.13 (3H, singlet, methyl H), 9.17 (3H, singlet, methyl H);

Ir (C) (ν, neat max.): 2930 (s), 2910 (s), 2850 (s), 1664 (w), 1550 (s), 1383 (m), 1372 (w), 1367 (m), 1258 (w), 1188 (w), 1102 (W), 1070 (w), 985 (w), 960 (w), 840 (m), 795 (w), 662 (w) cm$^{-1}$.

Hydrocarbons B

Calcd. for $C_{15}H_{24}$: C, 88.16%; H, 11.84%

Found: C, 88.07%; H, 11.76%

Mass spectrum (B): 204 mol. wt. (42%), 189 (40%), 175 (100%), 161 (11%), 148 (25%), 147 (23%), 133 (25%), 119 (50%), 107 (17%), 105 (55%), 95 (25%), 93 (20%), 91 (29%), 81 (20%), 79 (20%), 77 (16%), 69 (9%) 67 (13%), 65 (9%), 55 (21%), 53 (11%), 43 (6%), 41 (34%).

Nmr (D) (τ, CDCl$_3$): centered at 4.72 (1H, broad, vinylic H), 8.04 (4H, broad multiplet, allylic H), 8.25–8.83 (10H, multiplet, methylene H), 9.19 (3H, singlet methyl H), 9.21 (6H singlet, methyl H).

Ir (C) (ν, neat, max.): 2945 (s), 2920 (s), 2865 (s), 1670 (s), 1458 (s), 1440 (m), 1385 (m), 1376 (m), 1365 (m), 1345 (w), 1135 (w), 1070 (w), 960 (w), 838 (w), 815 (w), 770 (w) cm$^{-1}$.

EXAMPLE 2

β- and α-Chamigrenes (VII and VIII)

Into a reaction flask, equipped with an agitator, thermometer and a condenser, is charged 200 g. thujopsene (IV) and 20 g. of 90 percent formic acid. The batch is heated to 100°C and agitated at 100°C for 1 hour. 100 ml of water is the aqueous layer extracted 2 × 50 ml of benzene. The combined oil and benzene extracts are washed 2 × 50 ml of water, neutralized with 10%sodium bicarbonate and washed with 50 ml of water. The benzene is distilled off under reduced pressure leaving 200 g. of crude hydrocarbons. Vpc (A-1) of the crude shows seven components: (1) 0.7%, (2) 2.8%, (3) 2.8%, (4) 1.9%, (5) 4.7%, (6) 25.1%, (7) 62.0%. Components 1 and 2 are hydrocarbons of unknown structures, component 3 is 2,2,3,7-tetramethyltricyclo[5.2.2.0$^{1,6}$]undec-3-ene (XI). Components 4 and 5 are the tricyclic hydrocarbons A and B (IX) of Example 1.

Components 6 and 7 are the desired β- and α-chamigrenes (VII and VII).

The crude is vacuum distilled at 0.5mm using a 37 cm, 25mm dia. column packed with glass helices and the following fractions are collected:

1. 14.9 g; b.p. 60°–68°C/0.5mm; $n_D^{20}$ 1.5081; vpc (A–1): 26.1 percent β-chamigrene (VII); 41.7 percent α-chamigrene (VIII).
2. 36.3 g; b.p. 68°–69°C/0.5mm; $n_D^{20}$ 1.5106; vpc (A–1): 29.4 percent β-chamigrene (VII); 50.8 percent α-chamigrene (VII).
3. 131.8 g; b.p. 69°C/0.5mm; $n_D^{20}$ 1.5128; Sp. Gr. 25°C/25°C 0.9340; vpc (A–1): 25.4 percent β-chamigrene (VII); 66.9 percent α-chamigrene (VIII).
4. 9.0 g; b.p. 69°–79°C/0.5mm; $n_D^{2v}$ 1.5158; vpc (A–1): 8.5 percent β-chamigrene (VII): 81.4 percent α-chamigrene (VIII).
5. 6.0 g residue.

The redistillation of fractions 1, 2 and 4 will give more material similar to fraction 3, the desired products of the reaction.

The product of the reaction contains 7.8% of 1,4,11,11-tetramethylbicyclo[5.4.0]undeca-3,7-diene (X) (L. E. Friedrich, Dissertation, 1966, University Microfilms, Inc., Ann Arbor, Michigan No. 67–8559, p. 128) which is difficult to detect as it has the same retention time by vpc (A–1) as α-chamigrene (VIII). Vpc (A–4) shows this component as a shoulder in the main peak (α-chamigrene). Isomerization of a small sample of the chamigrenes according to Example 1 converts compound X to the known 2,2,3,7-tetramethyltricyclo[5.2.2.0$^{1,6}$]undec-3-ene (L. E. Friedrich, Dissertation, 1966, University Microfilms, Inc., Ann Arbor, Michigan, No. 67–8559 p.51, 160) (XI) and the chamigrenes to the tricyclic hydrocarbons A and B (IX) of Example 1. The components are now analyzed by vpc (A–1).

Pure samples of β- and α-chamigrenes (VII and VIII) are prepared by vacuum distillation at 5mm using a Nester/Faust distillation column (E), followed by preparative vapor phase chromatography. The following is the analytical data for the pure materials.

β-Chamigrene (VII)

Calcd. for $C_{15}H_{24}$: C, 88.16%; H, 11.84%
Found: C, 88.31%; H, 12.00%

Mass spectrum (B): 204 mol. wt. (26%), 189 (79%), 175 (11%), 161 (28%), 148 (21%), 147 (20%), 145 (11%), 135 (20%), 133 (45%), 131 (15%), 121 (55%), 119 (60%), 109 (25%), 107 (65%), 105 (72%), 95 (36%), 94 (44%), 93 (100%), 92 (22%), 91 (69%), 81 (38%), 79 (59%), 77 (39%), 69 (44%), 67 (35%), 65 (20%), 55 (55%), 43 (30%, 41 (94%).

Nmr (D) ( , CDCl$_3$): centered at 4.73 (1H, broad multiplet, vinyl H), 5.17 (1H, doublet, J = 2Hz, methylenic H), 5.50 (1H, doublet J = 2Hz, methylenic H), 7.27–8.27 (6H, multiplet, allylic H), 8.25–8.8 (6H, multiplet, methylene H), 8.43 (3H singlet, methyl H), 9.13 (3H, singlet, methyl H), 9.18 (3H, singlet, methyl H).

Ir (C) (ν, neat, max.): 2910 (s), 2860 (s), 1630 (m), 1435 (s), 1382 (m), 1362 (m), 1150 (w), 1010 (w), 885 (s), 797 (w) cm$^{-1}$.

α-Chamigrene (VIII)

Calcd. for $C_{15}H_{24}$: C, 88.16%; H, 11.84%
Found: C, 79.98%; H, 11.96%

Mass spectrum (B): 204 mol. wt. (38%), 189 (12%), 175 (2%), 161 (14%), 148 (8%), 147 (10%), 136 (82%) 134 (15%), 133 (36%), 121 (100%), 119 (74%), 107 (27%), 105 (44%), 93 (58%), 91 (41%), 80 (21%), 78 (20%), 69 (12%), 67 (10%), 65 (9%), 55 (27%), 43 (12%), 41 (39%).

Nmr (D) (τ, CDCl$_3$): 4.59 (2H, broad multiplet, vinylic H), 7.75–8.13 (6H, multiplet, allylic H), 8.17–8.75 (4H, multiplet, methylene H), 8.33 (6H, singlet, vinylic methyl H), 9.12 (3H, singlet, methyl H), 9.15 (3h, singlet, methyl H).

Ir (C) (ν, neat, max.): 2920 (s), 2840 (s), 1655 (w), 1450 (s), 1388 (s), 1380 (s), 1368 (s), 1340 (w), 1320 (w), 1220 (w), 1190 (w), 1160 (w), 1150 (w), 1130 (w), 1088 (m), 1072 (m), 1030 (w), 1020 (w), 980 (w), 955 (w), 942 (w), 830 (s), 810 (s), 800 (m), 760 (w) cm$^{-1}$. λ, cyclohexane, max. 192.5 nm (ε15,000).

EXAMPLE 3

Tricyclic $C_{15}H_{24}$ Hydrocarbons, Rich in 6,8-Ethano-1,1,6-trimethyl-1,2,3,5,6,7,8,8a-octahydronaphthalene (IX), from Cedarwood Hydrocarbons 2090 g. of Texas Cedarwood oil (c.v. 22.6; sp. gr. 0.9483; $n_D^{2v}$ 1.5040; [α]$_D$ = −52°) is distilled with a 37 cm glass helix column at a pressure of 0.6 mm. After a forerun of 28 g. (b.p. 45°–82°C), one obtains 1579 g. "-hydrocarbon fractions", b.p. 83°–102°C, $n_D^{20}$ 1.5038; sp. gr. at 25°C0.9361, [α]$_D$ = −59°. By gas chromatogram, these hydrocarbon fraction contain 37.9 percent α-cedrene, 9 percent β-cedrene, 41.0 percent thujopsene, and 9.4 percent thujopsens isomers.

Into a reaction flask, equipped with an agitator, thermometer, feeding funnel and a condenser is charged, while agitating, 1,000 g. acetic acid and 400 g. polyphosphoric acid (115 percent). The temperature is adjusted to 40°C and 1,000 g. of the above "hydrocarbon fractions", is fed in at 40°C over a 10 minute period. The batch is agitated at 40°C for 3 hours and poured onto 1,000 g. of agitated ice water. The layers are allowed to separate and the aqueous layer is extracted 3 × 50 ml benzene. The combined oil and benzene extracts are washed with 2 × 50 ml water, made alkaline with 10 percent aqueous sodium carbonate and washed neutral with salt water. The benzene is removed by distillation under slightly reduced pressure leaving 1,000 g. of crude hydrocarbons, which analyze by vpc (A–1) as follows: six components, (1) 2.4%, (2) 48.9% (3) 7.6%, (4) 14.4% (5) 21.5% (6) 5.1%. Component 1 is a $C_{15}H_{24}$ hydrocarbon of unknown structure, component 2 is a α-cedrene (I), component 3 is 2,2,3,7-tetramethyltricyclo[5.2.2.0$^{1,6}$]undec-3-ene (XI), components 4 and 5 are the desired tricyclic hydrocarbons A and B (IX) and component 6 is a α-chamigrene (VIII).

The crude is vacuum distilled at 0.5mm without fractionation using a 37 cm column packed with glass helices to give 938 g. of hydrocarbon (b.p. 63°–86 °C/0.5mm) distillate and 57.0 g. of residue. The hydrocarbon distillate is redistilled at 0.5mm using a 2 ft. (25mm diameter) Goodloe packed column (rated 14 theoretical plates), using a reflux ratio of 20:1 and the following fractions are collected:

1. 123.2 g.; b.p. 56°–68°C/0.5mm: $n_D^{20}$ 1.4974; vpc (A–1): 18.7 percent consisting of three unknown hydrocarbons, 81.3 percent α-cedrene (I).

2. 289.6 g.: b.p. 68°–70°C/0.5mm: $n_D^{20}$ 1.4988; vpc (A–1): 2.3 percent unknown hydrocarbon, 87.1 percent α-cedrene (I), 7.6 percent hydrocarbon A, 3.2 percent hydrocarbon B.

3. 115.5 g.: b.p. 70°–72°C/0.5mm: $n_D^{20}$ 1.5010; vpc (A–1): 67.2 percent α-cedrene, 14.3 percent 2,2,3,7-tetra-methyltricyclo[5.2.2.0$^{1,6}$]undec-3-ene (XI), 13.7 percent hydrocarbon A, 4.8 percent hydrocarbon B.

4. 112.1 g.: b.p. 72°C/0.5mm.: $n_D^{20}$ 1.5065; Sp. Gr. 25°C/25°C 0.9422; vpc (A–1):17.9 percent α-cedrene (I), 13.7 percent 2,2,3,7-tetramethyltricyclo[5.2.2.0$^{1,6}$]undec-3-ene (XI), 42.2 percent hydrocarbon A, 26.5 percent hydrocarbon B.

5. 196.8 g.: b.p. 72°–74°C/0.5mm: $n_D^{20}$ 1.5095; Sp. Gr. 25°C/25°C 0.9433; vpc (A–1): 27.1 percent hydrocarbon A, 65.6 percent hydrocarbon B, 7.3 percent α-chamigrene (VIII).

6. 60.7 g.: b.p. 74°–82°C/0.5mm: $n_D^{20}$ 1.5160; vpc (A–1): 36.7 percent hydrocarbon B, 39.2 percent α-chamigrene (VIII), 24.1 percent cuparene and acetates.

7. 30.0 g. residue.

Redistillation of fractions 2, 3, 4 and 6 will give an additional material similar to fraction 5, the desired tricyclic hydrocarbons A and B (IX).

The hydrocarbons A and B can be separated from fraction 5 as described in Example 1. The ir, mnr, and mass spectral data are identical to that given for hydrocarbons, A and B in Example 1.

EXAMPLE 4

β- and α-Chamigrenes (VII and VIII) from Cedarwood Hydrocarbons

Into a reaction flask, equipped with an agitator, thermometer and a condenser is charged 1,500 g. of "-hydrocarbon fractions" obtained in accordance with Example 3 and 150 g. 90 percent formic acid. The batch is agitated and heated over a one-half hour period to 100°C and agitated for 1 hour at 100°C. 200 ml of water is added and the batch is allowed to settle. The oil layer is washed 2 × 50 ml of water, made alkaline using 10 percent aqueous sodium carbonate and washed neutral with salt water. The crude oil, 1500 g. analyzes by vpc (A–1) mainly as seven components: (1) 1.0%, (2) 44.2%, (3) 6.5%, (4) 1.9%, (5) 3.7% (6) 12.0%, (7) 30.7%. Component 1 is a hydrocarbon of unknown structure, component 2 is α-cedrene (I), component 3 is 2,2,3,7 -tetramethyltricyclo [5.2.2.0$^{1,6}$]undec-3-ene (XI), components 4 and 5 are the hydrocarbons A and B (IX) of Example 1, and components 6 and 7 are the desired β- and α-chamigrenes (VII and VIII).

The crude material is purified by vacuum distillation at 0.5mm using a 4 ft. (25mm dia.) Goodloe packed column (rated 28 theoretical plates) and a reflux ratio of 5:1 and the following fractions are collected:

1. 27.9 g.: b.p. 43°–60°C/0.5mm: $n_D^{20}$ 1.4980; vpc (A–1): 25.6 percent consisting of eight light unknown hydrocarbons, 68.9 percent α-cedrene (I), 4.8 percent 2,2,3,7-tetramethyltricyclo[5.2.2.0$^{1,6}$]undec-3-ene (XI).

2. 606.0 g.: b.p. 61°–69°C/0.5mm: $n_D^{20}$ 1.4985; vpc (A–1): 1.8 percent unknown hydrocarbon, 90.7 percent α-cedrene (I), 7.5 percent 2,2,3,7-tetramethyl-tricyclo[5.2.2.0$^{1,6}$]undec-3-ene (XI).

3. 80.9 g.: b.p. 60°C/0.5 mm: $n_D^{20}$ 1.5010; vpc (A–1): 62.5 percent α-cedrene, 13.7 percent 2,2,3,7-tetra-methyltricyclo[5.2.2.0$^{1,6}$]undec-3-ene (XI), 6.8 percent hydrocarbon A (Example 1), 5.6 percent hydrocarbon B (Example 1), 7.8 percent β-chamigrene (VII), 3.6 percent α-chamigrene (VIII).

4. 108.2 g.: b.p. 69°–72°C/0.5mm: $n_D^{20}$ 1.5085; vpc (A–1): 16.7 percent α-cedrene (I), 4.8 percent 2,2,3,7-tetra-methyltricyclo[5.2.2.0$^{1,6}$]undec-3-ene (XI), 8.6% hydrocarbon A (IX) (Example 1), 14.5 percent hydrocarbon B (IX) (Example 1), 35.9 percent β-chamigrene (VIII), 19.5 percent α-chamigrene (VIII).

5. 565 g.: b.p. 72°–84°C/0.5mm; $n_D^{20}$ 1.5130; Sp. Gr. 25°C/25°C 0.9310; vpc (A–1):21.7 percent β-chamigrene (VII), 68.2 percent α-chamigrene (VIII), 7.9 percent unknown hydrocarbon, 2.1 percent cuparene.

6. 48.8 g.: b.p. 84°–90°C/0.5mm; $n_D^{20}$ 1.5150; vpc (A–1): 61.9 percent α-chamigrene (VIII), 18.0 percent (formate ester), 20.1 percent (formate ester).

7. 61.0 g. residue.

The redistillation of fractions 3, 4 and 6 will give more material similar to fraction 5, the desired chamigrenes.

The product of the reaction contains approximately 10 percent of 1,4,11,11-tetramethylbicyclo[5.4.0]undeca-3,7-diene (X) which is difficult to detect as it has the same retention time by vpc (A–1) as α-chamigrene (VIII). Vpc (A–4) shows this component as a shoulder on the main peak (α-chamigrene). Isomerization of a small sample of the product according to Example 1 converts hydrocarbon X to the known hydrocarbon 2,2,3,7-tetramethyltricyclo[5.2.2.0$^{1,6}$]undec-3-ene (XI) and the chamigrenes (VII and VIII) to the tricyclic hydrocarbons A and B, Example 1. The components are now easily analyzed by vpc (A–1).

Pure samples of β- and α-chamigrenes (VII and VIII) are prepared from the above fraction 5 as described in Example 2. The ir, nmr and mass spectral data are identical to the data given for the pure materials in Example 2.

EXAMPLES 5–20

Thujopsene (IV) or the chamigrenes (VII and VIII) are isomerized with the reagents and under the conditions given in the table below. Fifty ml benzene and 100 ml water are added and the benzene layer separated. The benzene layer is washed 2 × 50 ml of water, neutralized with 10 percent sodium bicarbonate and washed with water. The benzene is removed by distillation under reduced pressure and the residual crude hydrocarbons are vacuum distilled at 0.5mm using a distillation head. The distilled hydrocarbons are analyzed buy vpc (A–1). The relative retention times to thujopsene (IV) of the main components are as follows: 0.67, unknown hydrocarbon; 0.82, unknown hydrocarbon; 0.97, 2,2,3,7-tetramethyltricyclo [5.2.2.0$^{1,6}$]undec-3-ene (XI), 1.00, thujopsene (IV); 1.12, tricyclic hydrocarbon A; 1.25, tricyclic hydrocarbon B; 1.39, β-chamigrene (VII); 1.54, 1,4,11,11-tetramethylbicyclo [5.4.0]undeca-3,7-diene (X); 1.55, α-chamigrene (VIII); 1.69, 4,7,11,11-tetramethylbicyclo [5.4.0]undeca-1,3-diene; 2.01, cuparene.

In order to establish the amounts of the hydrocarbons (X) and (VIII), a 5 g. sample of the distilled hydrocarbons is isomerized using 5 g. acetic acid and 2 g. polyphosphoric acid for 3 hours at 40°C. The sample is worked up as described above and analyzed by vpc (A-1). The increase in the peak (relative retention time 0.97) corresponding to 2,2,3,7-tetramethyltricyclo[5.2.2.0$^{1,6}$]undec-3-ene (XI) is the amount of 1,4,11,11-tetramethylbicyclo[5.4.0]undeca-3,7-diene (X) in the sample before this isomerization. Subtracting the amount of (X) from the peak (retention time 1.54–1.55) of (X) and (VIII) gives the amount of α-chamigrene (VIII) in the original sample.

The desired in the table below are the chamigrenes (VII and VIII) and the tricyclic hydrocarbons A and B. The unidentified hydrocarbons, 4,7,11,11-tetramethylbicyclo[5.4.0]undeca-1,3-diene and cuparene are all included in the table below under "other hydrocarbons."

50°C, agitated for 30 minutes and allowed to settle. The oil layer is separated and the aqueous layer is extracted 3 × 50 ml of methylene dichloride. The combined oil and extracts are washed 2 × 50 ml of water and made alkaline to phenolphthalein using 10 percent sodium carbonate. The methylene dichloride is distilled off at atmospheric pressure to a pot temperature of 70°C. Benzene, 100-ml is added and the batch is washed neutral with salt water.

The benzene is distilled off under reduced pressure leaving 243 g. of crude. The crude is analyzed by vpc (A-2): 32.0 percent consisting of 9 hydrocarbons, 29.2 percent consisting of 5 isomeric tricyclic $C_{15}H_{26}O$ ketones, designated as isomers A,B,C,D,E and F, 38.8 percent 4-aceto-6,8a-ethano-1,1,6-trimethyl-1,2,3,5,6,7,8,8a-octahydronaphthalene (V), designated as isomer G.

The crude is vacuum distilled to remove the residue using a distillation still head to give 171 g. of distillate, b.p. 68°–148°C/0.2mm and 65 g. of residue.

The distillate is redistilled using a 6 inch column packed with glass helices and the following fractions

| Ex. | Thujopsene (IV), g. | Isomerization reagents, g. | Reaction conditions Temp., °C. | Time, Hr. | Yields Distilled hydrocarbon | Residue | Analysis of distilled hydrocarbons Hydrocarbon, percent | | | | | | | Other hydrocarbons, percent |
|---|---|---|---|---|---|---|---|---|---|---|---|---|---|---|
| | | | | | | | XI | IV | A | B | VII | X | VIII | |
| 5 | 50.0 | 6.0 Acetic acid / 4.6 Formic acid | 100 | 1 | 96.0 | 2.0 | | | | | 23.2 | 15.4 | 46.5 | 14.9 |
| 6 | 50.0 | 5.0 Acetic acid / 1.0 Oxalic acid | 100 | 1 | 9.60 | 2.0 | 2.9 | 2.4 | | | 27.4 | 10.1 | 53.3 | 3.9 |
| 7 | 30.0 | 30.0 Acetic acid / 12.0 Phosphoric acid (85%) | 40 | 3 | 92.0 | 5.0 | | | 2.3 | 25.0 | 22.1 | | 40.9 | 9.7 |
| 8 | 30.0 | 30.0 Acetic acid / 12.0 Phosphoric acid (100%) | 40 | 3 | 93.0 | 4.0 | 7.0 | | 5.2 | 18.0 | 6.0 | 11.3 | 45.8 | 6.7 |
| 9 | 30.0 | 30.0 Acetic acid / 12.0 Polyphosphoric acid (115%) | 40 | 3 | 90.0 | 7.0 | 11.0 | | 27.6 | 41.3 | | | 9.8 | 11.2 |
| 10 | 30.0 | 30.0 Acetic acid / 0.3 Polyphosphoric acid (115%) | 40 | 24 | 84.0 | 13.0 | | 26.9 | | | 18.3 | 7.8 | 43.8 | 3.2 |
| 11 | 30.0 | 30.0 Acetic acid / 0.6 Polyphosphoric acid (115%) | 40 | 3 | 93.3 | 6.7 | 2.2 | | | | 28.8 | 14.9 | 52.4 | 1.7 |
| 12 | 30.0 | 30.0 Acetic acid / 2.4 Polyphosphoric acid (115%) | 40 | 3 | 89.0 | 8.0 | 11.4 | | 16.4 | 36.9 | | | 24.3 | 11.0 |
| 13 | 30.0 | 30.0 Ethylene dichloride / 12.0 Polyphosphoric acid (115%) | 40 | 3 | 90.0 | 7.0 | 5.4 | | 5.0 | 12.5 | 17.0 | 7.2 | 45.6 | 7.3 |
| 14 | 50.0 | 9.0 Formic acid (50%) | 90 | 16 | 86.0 | 14.0 | | 7.8 | | 2.0 | 18.3 | 14.2 | 41.8 | 15.9 |
| 15 | 30.0 | 30.0 Acetic acid / 12.0 Sulfuric acid (85%) | 40 | 3 | 93.0 | 7.0 | 33.3 | | 21.6 | 28.9 | | | 7.1 | 9.1 |
| 16 | 30.0 | 30.0 Acetic acid / 12.0 Perchloric acid (70%) | 40 | 3 | 90.0 | 7.0 | 16.7 | | 30.1 | 43.5 | | | 2.1 | 7.6 |
| 17 | 50.0 | 50.0 Acetic acid | 50 | 1 | 68.0 | 30.0 | | 11.1 | | | 10.1 | 23.7 | 30.1 | 25.0 |
| Chamigrenes | | | | | | | | | | | | | | |
| 18 | 30.0 | 30.0 Acetic acid / 12.0 Polyphosphoric acid (115%) | 40 | 3 | 95.0 | 5.0 | 13.5 | | 22.9 | 35.9 | | | 15.9 | 11.8 |
| 19 | 30.0 | 30.0 Acetic acid / 12.0 Sulfuric acid (98%) | 50 | 3 | 90.0 | 7.0 | 18.6 | | 28.2 | 42.8 | | | | 10.4 |
| 20 | 30.0 | 30.0 Acetic acid / 12.0 Perchloric acid (70%) | 40 | 3 | 89.0 | 9.0 | 15.2 | | 28.4 | 46.7 | | | 2.1 | 7.6 |

EXAMPLE 21

4-Aceto-6,8a-ethano-1,1,6-trimethyl-1,2,3,5,6,7,8,8a-octahydronaphthalene (Isomer G) (V) and Isomers (A–F).

Into a reaction flask equipped with an agitator, thermometer, feeding funnel and a condenser is charged 480 g. of polyphosphoric acid (115 percent). Acetic anhydride, 400 g. is fed in with agitation over a 5 minute period and the temperature increases from 25° to 50°C. The batch is cooled to 25°C and 200 ml methylene dichloride is added. Thujopsene (IV), (98 percent), 204 g., is fed in over a 10 minute period with agitation and slight cooling at 25°C and the batch is agitated at 25°C for 2 hours. The temperature is Raised to 50°C over a 10 minute period and the batch is agitated at 50°C for 2 hours. The batch is poured on to 1,000 g. of agitated ice. The temperature is raised to are collected:

1. 53.2 g.; b.p. 86°–105°C/0.2mm; $n_D^{20}$ 1.5080; vpc (A-2): 18.8 percent consisting of 3 unidentified hydrocarbons, 28.6 percent hydrocarbons A (example 1), 33.8 percent hydrocarbons B (example 1), 3.5 percent consisting of three unidentified hydrocarbons, 9.8 percent isomers A–F, 5.5 percent isomer G (V).

2. 20.6 g.; b.p. 105°–115°C/0.2mm; $n_D^{20}$ 1.5133; vpc (A-2): 3.3 percent consisting of two unidentified hydrocarbons, 11.7 percent hydrocarbons A (example 1), 17.2 percent hydrocarbons B (example 1), 8.5 percent consisting of four unidentified hydrocarbons, 40.3 percent isomers A–F, 18.8 percent isomer G (V).

3. 94.5 g.; b.p. 115°–140°C/0.2mm; $n_D^{20}$ 1.5212; Sp. Gr. 25°C/25°C 1.0125; carbonyl value (oximation) 181.9; vpc (A-2): 43.7 percent Isomers A–F, 56.3 percent Isomer G (V).
4. 3.5 g. residue

Fraction 3 (a mixture of isomers A–G) is one of the desired products and is further analyzed as follows: vpc (A–3): 7.9% A, 6.8% B, 3.5% C, 8.5% D (4-aceto-2,2,3,7-tetramethyltricyclo [5.2.2.0$^{1,6}$]undec-3-ene, VI), 7.9% E, 13.2% F and 51.8% G. (V).

Ir (C) ($\nu$, neat, max.): 2945 (s), 2925 (s), 2862 (s), 1750 (w), 1737 (m), 1708 (s), 1730 (s), 1592 (m), 1455 (s), 1385 (m), 1365 (s), 1355 (s), 1278 (w), 1240 (s), 1220 (m), 1175 (m), 1158 (m), 1025 (w), 998 (w), 940 (w), 900 (w), 800 (w), 625 (w), 599 (w) cm$^{-1}$.

Mnr (60 Mhz, $\tau$, CDCl$_3$): 9.22, 9.15, 9.12, 9.08, 9.03, 9.00, 8.97, 8.90, 8.83, 8.77 (ca 9H, singlets methyl H), 8.73, 8.67, 8.58, 8.42, 8.40, 8.33, 8.30 (ca 10H, singlets methylene H), 7.98, 7.88, 7.85, 7.80, 7.70, 7.62 (ca 6 ½ singlets, methyl H on carbonyl plus allylic H), 4.75 (ca ½ H, broad multiplet, vinylic H): mol. wt. 246 (mass spectra).

In the above nmr the singlets at 9.22, 9.15 and most of the singlet at 7.80 are due to the isomer (V), the singlets at 9.03, 7.85 and a portion of the singlets at 9.08, 9.00 and a portion of the multiplet at 4.75 are due to isomer F; a portion of the singlets at 9.08, 9.00, 8.97 and 7.80 are due to isomer (VI) the singlets at 8.90, 7.88 and a portion of singlet 8.83 are due to isomer B; the singlet at 7.98, a portion of the singlets at 8.97, 8.83 and a portion of the multiplet at 4.75 are due to isomer B. Assignment for the isomers C and E can not be made since these isomers have not been obtained in the pure form.

EXAMPLE 22

4-Aceto-6,8a-ethano-1,1,6-trimethyl-1,2,3,5,6,7,8,8a-octahydronaphthalene (Isomer G, V) and Isomers (A–F)

A mixture of tricyclic C$_{17}$H$_{26}$O ketones (Isomers A–G), fraction 3, example 21, 71 g., is vacuum distilled at 0.05mm, reflux ratio 100 to 1 using a Nester/Faust distillation column (E). The following fractions are collected:

1. 4.1 g.: b.p. 60°–70°C/0.05mm; hydrocarbons + isomer A.
2. 1.3 g.; b.p. 70°C/0.05mm; isomer A.
3. 2.5 g.; b.p. 70°–73°C/0.05mm; isomers A + B.
4. 2.4 g.; b.p. 73°–74°C/0.5mm; isomer B.
5. 2.6 g.; b.p. 74°–75°C/0.5mm; isomers B + C.
6. 2.4 g.; b.p. 74°–76°C/0.05mm; isomers C + D.
7. 2.4 g.; b.p. 76°C/0.05mm; isomer D (VI).
8. 4.9 g.; b.p. 76°–80°C/0.05mm; isomer D (VI) + E.
9. 3.0 g.; b.p. 80°–88°C/0.05 mm; isomer E + F.
10. 3.4 g.; b.p. 88°–90°C/0.05mm; isomer F.
11. 18.8 g.; b.p. 90°–92°C/0.05mm; isomer F (15%) + isomer G (V) (85%).
12. 17.7 g.; b.p. 92°–93°C/0.05mm; isomer G (V).
13. 2.0 g. residue Fraction 12 is pure 4-aceto-6,8a-ethano-1,1,6-trimethyl-1,2,3,5,6,7,8,8a-octahydronaphthalene, isomer G (V), and analyzer as follows:

Calcd. for C$_{15}$H$_{26}$O: C, 82.87%; H, 10.64%
Found: C, 82.79%; H, 10.71%

Carbonyl value (oximation), 227.4; n$_D^{20}$ 1.5265; [$\alpha$]$_D^{25°\,C}$ 0°30′; $\lambda$, MeOH, max. 257mm ($\epsilon$ 6,745):

Nmr (D) ($\tau$, ppm, CDCl$_3$): 7.58 (2H, singlet allylic H), 7.70–8.00 (2H, multiplet, allylic H), 7,80 (3H, singlet, carbonyl methyl H), 8.17–9.00 (10H, multiplet, methylene H), 9.15 (3H, singlet methyl H), 9.20 (6H, singlet, methyl H).

Mass spectrum: 246 mol. wt. 246 (43%), 231 (19%), 218 (31%), 203 (58%), 189 (4%), 175 (14%), 161 (32%), 147 (11%), 133 (14%), 119 (15%), 109 (10%), 107 (9%), 105 (22%), 95 (15%), 93 (10%), 91 (20%), 81 (12%), 79 (12%), 77 (11%), 69 (9%), 67 (9%), 65 (7%), 55 (17%), 53 (10%), 43 (100%), 41 36%).

Ir (C) ($\nu$, neat, max.): 2940 (s), 2920 (s), 2855 (s), 1673 (s), 1588 (m), 1454 (m), 1382 (m), 1345 (m), 1355 (m), 1365 (m), 1280 (w), 1245 (M), 1235 (m), 1175 (m), 1130 (w), 940 (w) cm$^{-1}$.

The ethylene thioketal of isomer G (V) is prepared by dissolving 1 g. isomer G (V) in 10 ml of acetic acid and adding 1.1 ml of ethanedithiol followed by the addition of 1.1 ml of boron trifluoride etherate. The mixture is allowed to stand 3 ½ hours at room temperature. 50 ml of water is added and is extracted 3 × 25 ml of hexane. The hexane extracts are washed 2 × 50 ml water, 25 ml of 5% NaOH, 5 × 50 ml water and are dried over MgSO$_4$. The hexane is distilled off to give 1.1 g. of the crude crystalline thioketal. The crude is recrystallized twice from 10 ml of hexane and the crystals vacuum dried. The product analyzes as follows: m.p. 76°–77°C; mol. wt. 320 (mass spectrum (B)).

Nmr (D) ($\tau$, CDCl$_3$): 6.72 (4H, singlet, thioethylene H), 7.5–7.9 (4H, multiplet, allylic H), 8.10 (3H, singlet, methyl H), center at 8.62 (10H, broad pattern, methylene H), 9.12 (3H, singlet methyl H), 9.23 (6H, singlet, methyl H).

Ir (C) ($\nu$, KBr, max.): 2900 (s), 2840 (s), 1453 (s), 1423 (s), 1384 (s), 1370 (s), 1363 (s), 1279 (s), 1240 (m), 1141 (m), 1130 (m), 1085 (w), 1060 (w), 1035 (m), 1019 (m), 976 (w), 852 (m).

The X-ray crystal structure determination establishes the structure of the thioketal as the racemic ethylene thioketal derivative of 4-aceto-6,8a-ethano-1,1,6-trimethyl-1,2,3,5,6,7,8,8a-octahydronaphthalene (V). Isomer G is regenerated by the method of Corey (E. J. Corey and D. Crouse, J. Org. Chem., 33, 298(1968)) and which analyzes to give data identical to that given above for fraction 11. Thus, isomer G is 4-aceto-6,8a-ethano-1,1,6-trimethyl-1,2,3,5,6,7,8,8a-octahydronaphthalene (V).

Samples of Isomers A, B, D (VI) and F are prepared in high purity by the preparative vpc (A-1) of the above fractions 2, 4, 7 and 10. Isomers C and E are not obtained in high purity by the preparative *vpc* (A–1) of any of the above fractions.

The following is the data for the isomers A, B, D and F:

Isomer A:

Mass spectrum (B): mol. wt. 246 (4%), 321 (2%), 213 (2%), 203 (2%), 191 (4%), 176 (72%), 175 (33%), 161 (34%) 146 (6%), 133 (9%), 120 (34%), 105 (100%), 95 (13%), 91 (18%), 81 (11%), 79 (9%), 77 (10%), 69 (8%), 55 (15%), 43 (32%), 41 (24%).

Ir (C) ($\nu$, neat, max.): 2920 (s), 2855 (s), 1712 (s), 1455 (s), 1380 (m), 1360 (s), 1355 (s), 1245 (w), 1260 (w), 1280 (w), 1190 (w), 1165 (m), 1155 (m), 1140 (m), 1115 (w), 1050 (w), 960 (w), 950 (w), 850 (w), 820 (m), 695 (w), 590 (m) cm$^{-1}$.

Nmr ($\tau$, CDCl$_3$): 4.23 (1H, singlet, vinylic H), 7.17–7.82 (3H, multiplet, allylic H), 7.98 (3H, singlet, carbonyl methyl H), 8.33–9.03 (10H, multiplet, methylene H), 8.80 (3H, singlet, methyl H), 8.67 (3H, singlet, methyl H), 8.93 (3H, singlet, methyl H).

Isomer B:

Mass spectrum (B): mol. wt. 246 (4%), 231 (2%), 218 (74%), 203 (9%), 189 (3%), 175 (24%), 159 (15%), 145 (13%), 133 (19%), 119 (32%), 105 (31%), 91 (18%), 84 (64%), 69 (13%), 55 (14%), 43 (100%).

Ir (C) ($\nu$, neat, max.): 2930 (s), 2860 (s), 1710 (s), 1660 (w), 1465 (m), 1450 (s), 1380 (m), 1360 (s), 1350 (m), 1240 (m), 1170 (m), 1090 (w), 1050 (w), 1025 (w), 980 (w), 940 (w), 900 (w), 825 (m), 800 (w), 670 (m) cm$^{-1}$.

Nmr (D) ($\tau$, CDCl$_3$): 4.28 (1H, singlet, vinylic H), 7.25–7.83 (2H, multiplet, allylic H), 7.87 (3H, singlet, carbonyl methyl H), 8.00–8.70 (8H, multiplet, methylene H), 8.72–9.08 (3H, multiplet, methyl H), 8.83 (3H, singlet, methyl H), 8.90 (6H, singlet, methyl H).

Isomer D:

Mass spectrum (B): mol. wt. 246 (16%), 231 (35%), 218 (6%), 213 (3%), 203 (25%), 189 (5%), 175 (7%), 161 (11%), 147 (11%), 137 (11%), 135 (10%), 133 (17%), 123 (9%), 121 (10%), 119 (17%), 109 (13%), 107 (9%), 105 (13%), 95 (15%), 91 (11%), 81 (12%), 79 (8%), 77 (7%), 69 (10%), 55 (14%), 43 (100%), 41 (20%).

Ir (C) ($\nu$, neat, max.): 2940 (s), 2860 (s), 1690 (s), 1615 (w), 1560 (s), 1378 (m), 1362 (m), 1350 (m), 1240 (m), 1225 (m), 1205 (m) cm$^{-1}$.

Nmr (D) ($\tau$, CDCl$_3$): 7.77 (3H, singlet, carbonyl methyl H), 7.85–8.17 (3H, multiplet, possibly 2 allylic + 1 methine H), 8.28 (3H, vinyl methyl H), 8.28–8.82 (8H, multiplet, methylene H), 8.97 (3H, singlet, methyl H), 9.00 (3H, singlet, methyl H), 9.07 (3H, singlet, methyl H).

These data are identical to the values for an authentic sample of 4-aceto-2,2,3,7-tetramethyltricyclo[5.2.2.0$^{1,6}$]undec-3-ene (VI) prepared from 2,2,3,7-tetramethyltricyclo [5.2.2.0$^{1,6}$]undec-3-ene (XI) (L. E. Friedrich, Dissertation, page 160, University Microfilms, Ann Arbor, Michigan No. 67–8559).

Isomer F:

Mass spectrum (B): mol. wt. 246 (21%), 231 (48%), 217 (9%), 203 (50%), 189 (23%), 175 (15%), 173 (18%), 159 (22%), 147 (14%), 145 (15%), 133 (19%), 131 (15%), 119 (60%), 105 (33%), 95 (19%), 93 (15%), 91 (30%), 81 (19%), 79 (16%), 77 (17%), 69 (12%), 67 (11%), 65 (8%), 55 (23%), 43 (100 %), 41 (43%).

Ir (C) ($\nu$, neat, max.): 2915 (s), 2940 (s), 2858 (s), 1708 (s), 1453 (m), 1387 (w), 1368 (m), 1355 (m), 1220 (w), 1158 (m), 810 (w).

Nmr (D) ($\tau$, CDCl$_3$): 4.63–4.88 (1H, multiplet, vinylic H), 7.17–7.92 (3H, multiplet, allylic H or allylic and $\beta$ to carbonyl H), 7.83 (3H, singlet, carbonyl methyl H), 8.00–8.83 (10H, multiplet, methylene H), 8.98 (3H, singlet, methyl H), 9.03 (3H, singlet, methyl H), 9.07 (3H, singlet, methyl H).

EXAMPLE 23

4-Aceto-6,8a-ethano-1,1,6-trimethyl-1,2,3,5,6,7,8,8a-octahydronaphthalene (Isomer G, V) and Isomers (A-F)

Into a reaction flask equipped with an agitator, thermometer, feeding funnel and a condenser is charged 480 g. of polyphosphoric acid (115 percent). Acetic anhydride, 400 g., is fed in with agitation over a 5 minute period. The temperature increases from 25° to 50°C. The batch is agitated 15 minutes, cooled to 45°C and 204 g. thujopsene (IV) (98 percent) is fed in over a 15 minute period at 45°C. The batch is agitated at 45°C for 2 hours and poured on to 1,000 g. of ice. The batch is agitated at 50°C for 0.5 hour and allowed to settle. The oil layer is separated and the aqueous layer is extracted 3 × 50 ml benzene. The combined oil and extracts are washed 2 × 50 ml of water, made alkaline to phenolphthalein with 10% Na$_2$CO$_3$ and washed neutral with salt water. The benzene is distilled off under reduced pressure to give 241 g. of crude ketones which analyze by vpc (A–1): 19.8 percent consisting of 6 hydrocarbons, 38.5 percent ketones, isomers A–F and 41.7 percent isomer G (V).

The crude is vacuum distilled using a distillation still head and the following fractions collected;

1. 42.5 g.; b.p. 90°–115°C/0.5mm; n$_D^{20}$ 1.5081; vpc (A–2): 15 percent consisting of two unidentified hydrocarbons, 24.1 percent hydrocarbons A (example 1), 28.7 percent hydrocarbons B (example 1), 3.8 percent unidentified hydrocarbons (three components), 19.0 percent isomers A–F, 9.3 percent isomer G (V).

2. 11.5 g.; b.p. 105°–118°C/0.5mm; N$_D^{20}$ 1.5130; vpc (A–2): 3.4 percent two unidentified hydrocarbons, 8.6 percent hydrocarbons A (example 1), 11.8 percent hydrocarbons B (example 1) 6.1 percent four unidentified components, 44.3 percent isomers A–F, 25.8 percent isomer G (V).

3. 92.5 g.; b.p. 118°–150°C/0.5mm; N$_D^{20}$ 1.5186; Sp. Gr. 25°C/25°C 1.0132; carbonyl value (oximation) 185.0; vpc (A–2): 0.7 percent unidentified component, 50.9 percent isomers A–F, 48.4 percent isomer G (V).

4. 90 g. residue.

Fraction 3 is one of the desired products of this example and the ketones analyze by vpc (A–3): 3.7 percent isomer A, 7.3 percent isomer B, 1.1 percent isomer, C. 9.7 percent isomer D (4-aceto-2,2,3,7-tetramethyltricyclo[5.2.2.0$^{1,6}$]undec-3-ene (VI)), 3.7 percent isomer E, 12.4 percent isomer F and 55.6 percent isomer G (4-aceto-6,8a-ethane-1,1,6-trimethyl-1,2,3,5,6,7,8,8a-octahydronaphthalene (V)). The ir, nmr and mass spectrl data are identical to the data given for fraction 3, example 21. The material can be processed to pure isomer G (V) as described in example 22.

EXAMPLE 24

4-Aceto-6,8a-ethano-1,1,6-trimethyl-1,2,3,5,6,7,8,8a-octahydronaphthalene (Isomer G, V) and Isomers (A-F)

Two hundred forty grams of polyphosphoric acid (115 percent), 200 g. of acetic anhydride, 102 g. of methylene dichloride and 102 g. of tricyclic C$_{15}$H$_{24}$ hydrocarbons A and B(IX), fraction 3, example 1, are processed as described in example 21.

The crude amounts to 124 g. and analyzes as follows: vpc (A–2): 21.8 percent consisting of six hydrocarbons, 32.2 percent ketones, isomers A–F and 46 percent isomer G (V).

The crude is vacuum distilled using a distillation still head and the following fractions are collected:

1. 28.0 g.; b.p. 90°–123°C/0.5mm; n$_D^{20}$ 1.5092; vpc (A–2): 6 percent consisting of three unidentified hydrocarbons, 29.7 percent hydrocarbons A, (example 1), 35.3 percent hydrocarbons B (example 1), 3.7 percent consisting of two unidentified hydrocarbons, 15.5 percent isomers A-F, 3.6 percent isomer G (V).

2. 77.0 g.; b.p. 123°–165°C/0.5mm; $n_D^{20}$ 1.5230; Sp. Gr. 25°C/25°C 1.0148; carbonyl value (oximation) 198.0; vpc (A–2): 3.0 percent (3 unidentified components), 42.5 percent isomers A-F, 54.4 percent isomer G (V).

3. 17.0 g. residue.

Fraction 2 is one of the desired products of this example and the ketones analyze by vpc (A–3): 10.3 percent isomers A and B, 5.5 percent isomer C, 2.1 percent isomer D (4-aceto-2,2,3,7-tetramethyl-tricyclo[5.2.2.0$^{1,6}$]undec-3-ene, VI), 5.3 percent isomer E, 15.8 percent isomer F, 49.5 percent isomer G (4-aceto-6,8a-ethano-1,1,6-trimethyl- 1,2,3,5,6,7,8,8a-octahydronaphthalene (V). The ir, nmr and mass spectra data are identical to the data given for fraction 3, example 21.

The material can be processed to pure isomer G (V) as described in example 22.

EXAMPLE 25

4-Aceto-6,8a-ethano-1,1,6-trimethyl-1,2,3,5,6,7,8,8a-octahydronaphthalene (Isomer G, V) and Isomers (A-F)

Two hundred forty grams of polyphosphoric acid, 200 g. of acetic anhydride, 102 g. of methylene dichloride and 102 g. of β- and α-chamigrenes (VII & VIII), fraction 3, example 2 are processed as described in example 21.

The crude amounts to 129 g. and analyzes as follows: vpc (A–2): 28.7 percent hydrocarbons (six components), 35.1 percent isomers A-F, 36.2 percent isomer G (V).

The crude is vacuum distilled using a distillation head to give the following fractions:

1. 29.0g.; b.p. 75°–118°C/0.5mm; $n_D^{20}$ 1.5079; vpc (A–2): 21.6 percent (two unidentified hydrocarbons), 30.7 percent hydrocarbons A (example 1), 33.9 percent hydrocarbons B (example 1), 10.3 percent isomers A-D.

2. 54.5 g.; b.p. 118°–170°C/0.5mm; $n_D^{20}$ 1.5188; Sp. Gr. 25°C/25°C 1.0154, carbonyl value (oximation) 191.1; vpc (A–2): 0.9 percent (unidentified hydrocarbons), 45 percent isomers A-F, 53.5 percent isomer G (V)

3. 36.0 g. residue.

Fraction 2 is one of the desired products of this example and analyzes by vpc (A–3): 5.2 percent isomer A, 9.2 percent isomer B, 6.9 percent isomer C, 13.3 percent isomer D (4-aceto-2,2,3,7-tetramethyl-tricyclo[5.2.2.0$^{1,6}$]undec-3-ene, (VI), 7.4 percent isomer E, 9.2 percent isomer F, 44.0 percent isomer G (4-aceto-6,8a-ethano-1,1,6-trimethyl-1,2,3,5,6,7,8,8a-octahydronaphthalene, V). The ir, nmr and mass spectral data are identical to the data given for fraction 3, example 21.

The material can be processed to pure isomer G (V) as described in example 22.

EXAMPLE 26

4-Aceto-6,8a-ethano-1,1,6-trimethyl-1,2,3,5,6,7,8,8a-octahydronaphthalene (Isomer G, V) and Isomers (A-F)

Two hundred forty grams of polyphosphoric acid, 200 g. of acetic anhydride, 102 ml of methylene dichloride and 102 g. of hydrocarbons A and B/(IX), fraction 5, example 3, are processed as described in example 21.

The crude amounts to 117.5 g. and analyzes as follows: vpc (A–2): 37.4 percent consisting of six hydrocarbons, 25.3 percent isomers A-F, 37.3 percent isomer G (V).

The crude is vacuum distilled using a distillation still head to give the following fractions:

1. 36.0 g.; b.p. 85°–113°C/0.5mm; $n_D^{20}$ 1.5108; vpc (A–2): 3.9 percent unidentified hydrocarbon, 35.7 percent hydrocarbons A (example 1), 42.8 percent hydrocarbons B (example 1), 5.3 percent consisting of three unidentified components, 6.2 percent isomers A-F, 6.0 percent isomer G (V).

2. 4.5 g.; b.p. 113°121°C/0.5mm; $n_D^{20}$ 1.5124; vpc (A–2): 0.2 percent unidentified hydrocarbon, 24.2 percent hydrocarbons A and B, 12.8 percent consisting of four unidentified components, 37.2 percent isomers A-F, 25,6 percent isomer G (V).

3. 53.5 g.; b.p. 121°–143°C/0.5mm; $n_D^{20}$ 1.5214; Sp. Gr. 25°C/25°C 1.0145; carbonyl value (oximation) 200.8; vpc (A–2): 1.7 percent consisting of three unidentified components, 40.6 percent isomers A-F, 57.8 percent isomer G (V).

4. 7.0 g.; b.p. 143°–153°C/0.5 mm; $n_D^{20}$ 1.5318; vpc (A–2): 17.4 percent isomers A-F, 44.5 percent isomer G/(V), 38.1 percent consisting of two high boiling components.

5. 14.0 g. residue.

Fraction 3 is the desired product and the ketones analyze by vpc (A–3): 8.3 percent isomer A, 9.9 percent isomer B, 1.0 percent isomer C, 0.4 percent isomer D (4-aceto-2,2,3,7-tetramethyltricyclo[5.2.2.0$^{1,6}$]undec-3-ene, VI), 7.7 percent isomer E, 15.3 percent isomer F, 57.4 percent isomer G (4-aceto-6,8a-ethanol-1,1,6-trimethyl-1,2,3,5,6,7,8,8a-octahydronaphthalene, V). The ir, nmr and mass spectral data are identical to that given for fraction 3, example 21. The material can be processed to pure isomer G as described in example 22.

EXAMPLE 27

4-Aceto-6,8a-ethano-1,1,6-trimethyl-1,2,3,5,6,7,8,8a-octahydronaphthalene (Isomer G, V) and Isomers (A-F)

Two hundred forty grams of polyphosphoric acid (115 percent), 200 g. of acetic anhydride, 202 ml of methylene dichloride and 102 g. of α- and β-chamigrenes (VII & VIII)., fraction 5, example 4, are processed as described in example 21.

The crude amounts to 120 g. and analyzes as follows: vpc (A–2): 39.2 percent consisting of 7 hydrocarbons, 31.6 percent isomers A-F, 29.0 percent isomer G (V).

The crude is vacuum distilled using a distillation still head and the following fractions are collected:

1. 30.5 g.; b.p. 85°–103°C/0.5mm; $n_D^{20}$ 1.5095; vpc (A–2): 21.3 percent 3 unidentified hydrocarbons, 27.9 percent hydrocarbons A (example 1), 31.2 percent hydrocarbons B (example 1), 11.0 percent consisting of 2 unidentified components, 8.5 percent isomers A–D.

2. 14.5 g.; b.p. 103°–120°C/0.5mm; $n_D^{20}$ 1.530; vpc (A–2): 5 percent two unidentified hydrocarbons, 24.2 percent hydrocarbons A and B (example 1), 13.9 percent consisting of three unidentified components, 35.7 percent isomers A–F, 20.1 percent isomer G (V).

3. 46.0 g.; b.p. 120°–168°C/0.5mm; $n_D^{20}$ 1.5222; Sp. Gr. 25°C/25°C 1.0198; carbonyl value (oximation) 174.3; vpc (A–2): 3.6 percent consisting of five unidentified components, 47.2 percent isomers A–F, 49.2 percent isomer G.

4. 28.0 g. residue.

Fraction 3 is the desired product and the ketones analyze by vpc (A–3): 4.6 percent isomer A, 8.3 percent isomer B, 5.1 percent isomer C, 14.9 percent isomer D (4-aceto-2,2,3,7-tetramethyltricyclo[5.2.2.0$^{1,6}$]undec-3-ene, VI), 7.1 percent isomer E, 11.4 percent isomer F, 48.6 percent isomer G (4-aceto-6,8a-ethano-1,1,6-trimethyl-1,2,3,5,6,7,8,8a-octa-hydronaphthalene, (V). The ir, nmr and mass spectral data are identical to that given for fraction 3, example 21.

Pure isomer G (V) is obtained from this material as is bescribed in example 22.

EXAMPLE 28

Mixture of tricyclic $C_{17}H_{26}O$ ketones containing acetylcedrene (II) enriched in 4-aceto-6,8a-ethano-1,1,6-trimethyl-1,2,3,5,6,7,8,8a-octahydronaphthalene (Isomer G, V)

Two hundred forty grams of polyphosphoric acid (115 percent), 200 g. of acetic anhydride, 202 ml of methylene dichloride and 102 g. of hydrocarbons, vpc (A–1): 17.9 percent α-cedrene/(I), 13.7 percent 2,2,3,7-tetramethyltricyclo[5.2.2.0$^{1,6}$]undec-3-ene(XI), 42.2 percent hydrocarbons A, 26.5 percent hydrocarbons B from fraction 4, Example 3, are processed as described in example 21.

There is obtained 115 g. of crude which analyzes by vpc (A–2) as follows: 36.1 percent hydrocarbons (six components), 8.8 percent isomers A–C, 13.4 percent acetylcedrene (II) and isomer D (VI), 13.5 percent isomer E and F, 26.6 percent isomer G (V).

The crude is vacuum distilled using a distillation still head and the following fractions are collected:

1. 33.0 g.; b.p. 80°–105°C/0.5mm; $n_D^{20}$ 1.5071; vpc (A–2): 23.5 percent α-cedrene (I), 11.7 percent 2,2,3,7-tetramethyltricyclo[5.2.2.0$^{1,6}$]undec-3-ene (XI), 28.1 percent hydrocarbons A (example 1), 25.3 percent hydrocarbons B (example 1) 1.3 percent 2 unidentified components, 3.5 percent isomers A and B, 2.7 percent acetylcedrene (II) and isomer D(VI), 3.9 isomers E–G.

2. 6.0 g.; b.p. 105°–123°C/0.5mm; $n_D^{20}$ 1.5117; vpc (A–2): 9.2 percent α-cedrene (I), 6.2 percent 2,2,3,7-tetramethyltricyclo-[5.2.2.0$^{1,6}$]undec-3-ene(XI), 19.9 percent hydrocarbons A (example 1), 25.4 percent hydrocarbons B (example 1), 4.4 percent consisting of four unidentified components, 11.7 percent isomers A and B, 8.2 percent acetyl cedrene (II) and isomer D (VI), 5.3 percent isomers E and F, 9.8 percent isomer G (V).

3. 62.4 g.; b.p. 123°–156°C/0.5 mm; $n_D^{20}$ 1.5189; Sp. Gr. 25°C/25°C 1.0129; carbonyl value (oximation) 186.9; vpc (A–2): 17.2 percent isomers A and B, 14.8 percent acetylcedrene (II) and isomer D (VI), 18.5 percent isomers E and F, 49.4 percent isomer G (V).

4. 11.0 g. residue.

Fraction 3 is the desired product and the ketones analyze by vpc (A–3): 4.2 percent isomer A, 5.0 percent isomer B, 17.8 percent acetylcedrene (II) and isomer D (VI), 7.1 percent isomer E, 14.4 percent isomer F and 51.5 percent isomer G (V).

The ir, nmr and mass spectral data is compatible with a mixture of the above ketones.

EXAMPLE 29

Mixture of tricyclic $C_{17}H_{26}O$ ketones containing acetylcedrene, 4-aceto-6,8a-1,1,6-trimethyl-1,2,3,5,6,7,8,8a-octa-hydronaphthalene (Isomer G, V) & Isomers (A–F)

Four hundred eighty grams of polyphosphoric acid (115 percent), 400 g. of acetic anhydride, 200 ml of ethylene dichloride and 204 g. of cedarwood hydrocarbons (vpc (A–1): 0.7 percent unknown $C_{15}H_{24}$ hydrocarbon, 37.0 percent α-cedrene (I), 7.4 percent β-cedrene (III), 50.7 percent thujopsene (IV), 4.7 percent thujopsene isomers) is processes as described in example 21, except ethylene dichloride is used for the extractions instead of methylene dichloride.

The crude amounts to 219 g. which analyzes as follows: vpc (A–2): 28.7 percent hydrocarbons (five components), 6.4 percent isomers A, B and C, 33.8 percent acetylcedrene (II), and isomer D (VI), 11.1 percent isomers E and F, 21.3 percent isomer G (V).

The crude is vacuum distilled using a distillation still head and the following fractions are collected:

1. 37.5 g.; b.p. 85°–105°C/0.5mm; $n_D^{20}$ 1.503; vpc (A–2): 100 percent hydrocarbons (eight components).

2. 13.0 g.; b.p. 105°–113°C/b 0.5 mm; $n_D^{20}$ 1.5077; vpc (A–2): 61.8 percent hydrocarbons (six components), 38.2 percent ketones (acetylcedrene (II), isomers A–G).

3. 9.0 g.; b.p. 113°–120°C/0.5 mm; $n_D^{20}$ 1.5113; vpc (A–2): 35.8 percent hydrocarbons (six components), 64.2 percent ketones (acetylcedrene (II), isomers A–G).

4. 99.5 g.; b.p. 120°–168°C/0.5mm; $n_D^{20}$ 1.5195; Sp. Gr. 25°C/25°C 1.0035; carbonyl value (oximation) 190.1; vpc (A–2): 4.8 percent hydrocarbons (four components), 95.2 percent ketones (acetylcedrene (II) isomer A–G).

5. 10.0 g.; b.p. 168°–180°C/0.5mm; $n_D^{20}$ 1.5286; vpc (A–1): 40 percent ketones (acetylcedrene (II), isomers A–G), 60 percent (high boiling components).

6. 47.0 g. residue.

The product, fraction 4, is the usual product obtained by the acetylation of cedarwood hydrocarbons which analyzes by vpc (A–3) as follows: 5.3 percent isomer A, 10.0 percent isomer B, 45.5 percent acetylcedrene (II) and isomer D (VI), 7.3 percent isomer E, 12.0 percent isomer F, 19.9 percent isomer G (V).

The ir, nmr and mass spectra data is compatible with a mixture of the above ketones.

EXAMPLE 30

(4-Aceto-6,8a-ethano-1,1,6-trimethyl-1,2,3,5,6,7,8,8a-octahydronaphthalene (Isomer G, V) and Isomers (A-F)

A mixture of the tricyclic hydrocarbons A and B (IX), example 1, fraction 3 is vacuum distilled at 5mm using a Nester/Faust column (E) and a reflux ratio of 20 to 1 to give hydrocarbons A and hydrocarbons B. The analysis of the hydrocarbons is the same as reported in example 1.

A. Polyphosphoric acid, 22 g., acetic anhydride, 18 g., methylene dichloride, 9 ml, and hydrocarbons A, 9 g., are processed as described in example 21.

The crude amounts to 11 g. and analyzes as follows: vpc (A–2): 27.3 percent consisting of nine hydrocarbons, 33.5 percent isomers A–F, 39.2 percent isomer G(V).

The crude is vacuum distilled using a micro distillation still head and the following fractions are collected:
1. 2.5 g.; b.p. 83°–110°C/0.4mm; $n_D^{20}$ 1.5056; vpc (A–2): 10.3 percent consisting of four unidentified hydrocarbons, 38.5 percent hydrocarbons A (example 1), 45.0 percent hydrocarbons B (example 1), 2.1 percent consisting of two unknown components, 4.0 percent isomer A.
2. 1.0 g.; b.p. 110°–118°C/0.4mm; $n_D^{20}$ 1.5135; vpc (A–2): 30.2 percent hydrocarbons A and B (example 1), 13.5 percent consisting of six unknown components 41.5 percent isomers A–F; 16.1 percent isomer G (V).
3. 5.5 g.; b.p. 118°–150°C/0.4mm; $n_D^{20}$ 1.5230; carbonyl value (oximation) 191.3, vpc (A–2): 2.1 percent consisting of three unknown components, 45.7 percent isomers A–F, 52.2 percent isomer G (V).
4. 1.5 g. residue.

Fraction 3 is the desired product of isomers and the ketones analyze by vpc (A–3): 18.2 percent isomer A, 7.8 percent isomer B, 4.3 isomer C, 1.3 percent isomer D (VI), 7.0 percent isomer E, 12.7 percent isomer F and 48.7 percent isomer G (V).

The nmr, ir and mass spectral data on the products are compatible with the data for a mixture of the ketones.

Pure isomer G (V) is prepared by preparing larger quantities of the product and proceeding as described in example 21.

B. Polyphosphoric acid, 22 g., acetic anhydride, 18 g., methylene dichloride 9 ml, and hydrocarbons B, 9 g., are processed as described in example 21.

The crude, containing a small amount of benzene, amounted to 12 g. and analyze as follows: vpc (A–2): 21.2 percent consisting of nine hydrocarbons, 30.6 percent isomers A–F, 48.2 percent isomer G (V).

The crude is vacuum distilled using a micro distillation still head and the following factions are collected:
1. 1.5 g.; b.p. 80°–105°C/0.7mm; $n_D^{20}$ 1.5090; vpc (A–2): 7.5 percent three unidentified hydrocarbons, 30.7 percent hydrocarbons A (example 1), 35.2 percent hydrocarbons B (example 1), 5.6 percent consisting of four unknown components, 11.6 percent isomers A–F, 9.3 percent isomer G (V).
2. 1.0 g.; b.p. 105°–120°C/0.7mm; $n_D^{20}$ 1.5150; vpc (A–2): 1.9 percent three unidentified hydrocarbons, 15.4 percent hydrocarbons A (example 1), 20.5 hydrocarbons B (example 1), 9.8 percent consisting of 4 unknown components, 29.2 percent isomers A–F, 23.2 percent isomer G (V).
3. 5.5 g.; b.p. 120°–158°C/0.7mm; $n_D^{20}$ 1.5235; carbonyl value (oximation) 202.7; vpc (A–2): 34.0 percent isomers A–F, 65.9 percent isomer G (V).
4. 1.5 g. residue.

Fraction 3 is the desired product of isomers and the ketones analyze by vpc (A–3): 9.4 percent isomer A, 4.5 percent isomer B, 5.4 percent isomer C, 0.2 percent isomer D (VI), 6.5 percent isomer E, 12.2 percent isomer F and 61.8 percent isomer G (V).

The ir, nmr, and mass spectral data are compatible with the data for a mixture of the ketones.

Pure isomer G (V) is prepared by preparing larger quantities of the product and proceeding as described in example 21.

EXAMPLE 31

Acetylcedrene (II)

Four hundred eighty grams of polyphosphoric acid, 400 g. of acetic anhydride, 200 g. of methylene dichloride and 204 g. of α-cedrene (I) (prepared as described in example 4) are processed as described in example 21 except the agitation period at 50°C is increased from 2 hours to 3 hours.

The crude acetylcedrene amounts to 210 g. and analyzes by vpc (A–2) as follows: 22.5 percent α-cedrene, 77.5 percent consisting of 59.5 percent acetylcedrene (II) and 18.0 percent of five isomeric $C_{17}H_{26}O$ ketones.

The crude is vacuum distilled using a 6 inches column packed with glass helices and the following fractions are collected:
1. 66.0 g.; b.p. 80°–90°C/0.4mm; $n_D^{20}$ 1.5008; vpc (A–2): 86.5 percent α-cedrene (I), 8.8 percent acetylcedrene(II).
2. 5.0 g.; b.p. 90°–98°C/0.4mm; $n_D^{20}$ 1.5135; vpc (A–2): 12.8 percent α-cedrene (I), 1.3 percent unidentified hydrocarbons, 85.5 percent consisting of 64.0 acetylcedrene (II) and 64 21.9 percent isomeric $C_{17}H_{26}O$ ketones.
3. 89.0 g.; b.p. 98°–105°C/0.4mm; $n_D^{20}$ 1.5169, Sp. Gr. 1.0024; carbonyl value (oximation) 207.0; vpc (A–2): 80.9 percent acetylcedrene (II), 19.1 percent consisting of four $C_{17}H_{26}O$ isomeric ketones.
4. 5.0 g.; b.p. 105°–115°C/0.4mm; $n_D^{20}$ 1.5175; vpc (A–2): 60.0 percent acetylcedrene (II), 40.0 percent consisting of five isomeric $C_{17}H_{16}O$ ketones.
5. 35.0 g. residue.

Pure acetylcedrene (II) is obtained by the redistillation of fraction 3 above using a Nester/Faust distillation column (E) at 0.01 mm and a reflux ratio of 30 to 1. The pure material analysis as follows: b.p. 84°–86 °C/0.01mm; carbonyl value (oximation) 216.0; $n_D^{20}$ 1.5152; Sp. Gr. 25°C/25°C 1.0029;

Mass spectrum (B): 246 mol. wt. (11%), 231 (17%), 203 (9%), 175(4%), 162 (5%), 161 (36%), 148 (6%), 147 (17%), 146 (2%), 145 (2%), 136 (2%), 135 (9%), 133 (4%), 123 (8%), 121 (8%), 119 (20%), 109 (4%), 107 (2%), 105 (14%), 100 (8%), 95 (2%), 93 (4%), 91 (9%), 81 (5%), 79 (4%), 77 (5%), 69 (20%), 67 (3%), 56 (3%), 55 (10%), 53 (3%), 43 (100%).

Nmr (D) (τ, ppm, CDCl₃): 7.63 (1H, quartet, $J =$ 2Hz, methine allylic H), 7.80 (3H, singlet, carbonyl methyl H), 8.02, 8.05, 8,08 (5H, singlet + multiplet, vinylic methyl H + allylic H), 8.17–8.75 (8H, multiplet, methylene H), 8.98 (3H, singlet, methyl H), 9.02 (3H, singlet, methyl H), 9.1 (3H, doublet, $J = 8$Hz, methyl H).

Ir (ν, neat, max.): 2950 (s), 2865 (s), 2825 (w), 1700 (w), 1672 (s), 1600 (m), 1460 (s), 1430 (m), 1415 (w), 1380 (m), 1370 (m), 1355 (s), 1230 (s), 1198 (w), 1160 (w), 1130 (w), 1085 (w), 1020 (w), 935 (w), 970 (w), 640 (w), 600 (w), 565 (w) cm⁻¹.

EXAMPLE 32

4-Aceto-6,8a-ethanol-1,1,6-trimethyl-1,2,3,5,6,7,8,8a-octahydronaphthalene (Isomer G, V) and Isomers (A–F)

Into a reaction flask equipped with a gas inlet tube which extends to the bottom of the flask, an agitator, thermometer, feeding funnel and a condenser with drying tube is charged 100 g. of acetic anhydride. 20 g. of boron trifluoride gas is passed in over a 15 minute period with cooling at 25°C. 51 g. of hydrocarbons A and B, fraction 3, example 1, are added over a 15 minute period at 25°C and the batch is agitated at 25°C for 4 hours. The batch is poured onto 100 g. of agitated ice. The batch is warmed to 50°C and agitated for one-half hour and allowed to settle. The oil layer is separated and the aqueous layer extracted 3 × 50 ml of benzene. The combined oil and benzene extracts are washed 2 × 50 ml of water, made alkaline to phenolphthalein with 5% NaOH and washed neutral with salt water. The benzene is distilled off under reduced pressure leaving 61 g. of crude. The crude analyzes by vpc (A–2): 31.5 percent hydrocarbons (nine components), 3.96 percent isomers A–F, 28.7 percent isomer G (V).

The crude is vacuum distilled using a distillation still head and the following fractions are collected:

1. 11.5 g.; b.p. 102°–114°C/0.5mm; n_D²⁰ 1.5030; vpc (A–2): 5.0 percent consisting of four unknown hydrocarbons, 25.9 percent hydrocarbons A (example 1), 29.8 percent hydrocarbons B (example 1), 8.4 percent consisting of four unidentified components, 23.4 percent isomer A–F, 7.2 percent isomer G (V).
2. 7.0 g.; b.p. 114°–124°C/0.5mm; n_D²⁰ 1.5165; vpc (A–2): 1.8 percent consisting of four unknown hydrocarbons, 11.9 percent hydrocarbon A (example 1), 15.1 percent hydrocarbon B (example 1), 13.3 percent consisting of four unidentified components, 44.8 percent isomers A–F, 13.3 percent isomer G (V).
3. 28.1 g.; b.p. 124°–162°C/0.5mm; n_D²⁰ 1.5241; Sp. Gr. 25°C/25°C 1.0191; carbonyl value (oximation) 187.9; vpc (A–2): 6.4 percent consisting of four unidentified components, 61.1 percent isomers A–F, 34.4 percent isomer G (V).
4. 12.0 g. residue.

Fraction 3 is the desired product and the ketones are analyzed by vpc (A–3): 19 percent isomer A, 6.8 percent isomer B, 13.5 percent isomer C, 3.2 percent isomer D (VI), 7.5 percent isomer E, 15.3 percent isomer F and 34.7 percent isomer G (V).

The ir, nmr and mass spectral data are compatible with the product being a mixture of the above isomers. Pure isomer G (V) can be obtained by processing this material according to example 21.

EXAMPLE 33

Odor evaluations and comparisons are made on the following materials:

1. 4-Aceto-6,8a-ethano-1,1,6-trimethyl-1,2,3,5,6,7,8,8a-octahydronaphthalene (V, isomer G), Example 22, fraction 2, 100 percent isomer G (V).
2. Acetylcedrene (II), acetylthujopsene mixture, Example 29; 5.3 percent isomer A, 10.0 percent isomer B, 45.5 percent acetylcedrene (II) plus isomer D (VI), 7.3 percent isomer E, 12.0 percent isomer F, 19.9 percent isomer G (V).
3. Acetylthujopsene mixture, Example 21, fraction 3, 7.9 percent isomer A, 6.8 percent B, 3.5 percent isomer C, 8.5 percent isomer D (VI), 7.9 percent isomer E, 13.2 percent isomer F, 51.8 percent isomer G (V).
4. Acetylcedrene (II)-acetylthujopsene mixture prepared by mixing 7.77 parts of fraction 3, Example 28 with 2.23 parts of acetylcedrene (II) of Example 31. Analysis of mixture: 3.3 percent isomer A, 3.9 percent isomer B, 36.1 percent acetylcedrene (II) and isomer D (VI), 5.5 percent isomer E, 11.2 percent isomer F, 40.0 percent isomer G (V).
5. Acetylcedrene-acetylthujopsene mixture, example 28; 4.2 percent isomer A, 5.0 percent isomer B, 17.8 percent acetylcedrene (II) and isomer D (VI), 7.1 percent isomer E, 14.4 percent isomer F, 51.5 percent isomer G (V).
6. Acetylcedrene-acetylthujopsene mixture, prepared by mixing 7.22 parts acetylcedrene—acetylthujopsene mixture, Example 28, fraction 3, with 2.78 parts isomer G (V), Example 22. Analysis of mixture: 3.0 percent isomer A, 3.6 percent isomer B, 12.9 percent acetylcedrene (II) plus isomer D (VI), 5.1 percent isomer E. 10.4 percent isomer, F, 65.0 percent isomer G (V).
7. Acetylcedrene (II), Example 31; 100 percent acetylcedrene (II), 0 percent isomer G (V).
8. Acetylthujopsene mixture, isomers A–F, prepared as described in Example 22 and combining fractions 1–11: 100 percent isomers A–F, 0 percent isomer G (V).
9. Ambergris.

The odor characteristics and odor comparisons of the above materials, 1 to 9, were studied by preparing a 10 percent solution in ethanol of each and applying 10μl of the solutions to smelling blotters and allowing them to evaporate at room temperature. The odors on the blotters were studied over a period of 10 days.

Material 1, pure isomer G(V), is a very intense, amber, woody and musk-like odor. It is reminiscent of ambergris, material 9, however, it is sweeter and more tenacious than ambergris. The material compared with material 9, ambergris, is approximately three times stronger than ambergris and lasts ten times longer.

Material 2 has a woody amber odor which is weaker than material 1 by a factor of 2. The odor is thinner and possesses a more characteristic cedar odor than material 1.

Material 3 has a warm woody, amber and musk odor, slightly weaker than the pure material 1, but still nearly twice as strong as ambergris, material 9, and lasting ten times longer than ambergris, the material is over twice as strong and less of a cedar odor than material 2.

Material 4 possess a strong woody amber, musk odor. Material 4 is approximately the same strength as material 3 with a more cedar-like character. Material 4 is nearly twice as strong as material 9 and lasts 10 times longer.

Material 5 possesses a woody, amber and musk odor, about the same strength as material 3 with a slightly more cedar-like character.

Material 6 a warm, amber, woody and musk-like odor and its odor is very similar to material 1. The material is nearly twice as strong as ambergris, material 9, and lasts ten times longer.

Acetylcedrene (II), material 7, possesses a cedar woody odor having no amber or musk notes. Its odor is not related to ambergris, material 9, and is not of especial interest in perfumery.

Material 8 has a dry weak woody odor with a slight amber note. Its odor cannot be related to ambergris and would be of little value as a perfume material.

EXAMPLES 34–43

A cologne base (example 34) is prepared using the ingredients listed in example 34. The materials, 1–9, of example 33 are compounded to the extent of 2 percent by weight into the cologne base of example 34 to give the colognes of examples 35–43.

The odor characteristics and fixative properties of the colognes are studied and compared by applying 10µl of 10 percent ethanolic solutions of the colognes to smelling blotters and observing the odor while allowing the colognes to evaporate at room temperature over approximately 12 hours.

colognes showed improved balance and bouquet. In addition, cologne 35 has a warm woodiness which is considered an even more desirable character than that contributed by the ambergris (example 43). This demonstrates that the presence of 2 percent of material 1 produces essentially the same effect as 2 percent ambergris. Material 1 functions as a good blender and fixative with a more pleasing woody amber odor.

Material 1, isomer G, can be used in fragrances from 0.1 to 10 percent by weight. Larger quantities may also be used depending upon the type of fragrance and the effect desired.

The colognes of examples 34, 35 and 36 are compared. Cologne, example 36, containing material 2, has a more pleasing woody odor than cologne 34, which is an improvement; however, on dry out the balance and bouquet are lost, whereas cologne 35 still has a pleasing bouquet and better balance which is evidence of improved fixation.

The cologne of example 37 is compared with the colognes of examples 34, 35 and 36. Material 3 contributes body and a warm woody nuance to the cologne 37. The top notes are brighter and the colognes dry out with a definite improvement in bouquet and balance over colognes 34 and 36. After 12 hours the bouquet of colognes 37 and 35 are still evident whereas that of the colognes 34 and 36 have disappeared. This result indicates that the presence of 50% isomer G in material 3 produces the same fixative properties as material 1, pure isomer G.

The material 3 may be used in fragrances from 0.1 to 10 percent by weight. To realize the best fixative function, it should be used at approximately 1 percent by weight and above.

Material 4 contributes body and a warm woody amber nuance to cologne 38. The top notes are brighter, and as the cologne dries out, an improvement

| Examples | 34 | 35 | 36 | 37 | 38 | 39 | 40 | 41 | 42 | 43 |
|---|---|---|---|---|---|---|---|---|---|---|
| Undecylic aldehyde | 2 | 2 | 2 | 2 | 2 | 2 | 2 | 2 | 2 | 2 |
| Cedryl acetate | 195 | 195 | 195 | 195 | 195 | 195 | 195 | 195 | 195 | 195 |
| Clove bud oil | 20 | 20 | 20 | 20 | 20 | 20 | 20 | 20 | 20 | 20 |
| Costus oil | 1 | 1 | 1 | 1 | 1 | 1 | 1 | 1 | 1 | 1 |
| Diethyl phthalate | 80 | 60 | 60 | 60 | 60 | 60 | 60 | 60 | 60 | 60 |
| Estragon oil | 30 | 30 | 30 | 30 | 30 | 30 | 30 | 30 | 30 | 30 |
| Galbanum oil | 10 | 10 | 10 | 10 | 10 | 10 | 10 | 10 | 10 | 10 |
| Isobornyl acetate | 30 | 30 | 30 | 30 | 30 | 30 | 30 | 30 | 30 | 30 |
| Laurine Extra® [1] | 20 | 20 | 20 | 20 | 20 | 20 | 20 | 20 | 20 | 20 |
| Lavander 38/42 | 112 | 112 | 112 | 112 | 112 | 112 | 112 | 112 | 112 | 112 |
| Lemon oil | 362 | 362 | 362 | 362 | 362 | 362 | 362 | 362 | 362 | 362 |
| Musk Ambrette | 10 | 10 | 10 | 10 | 10 | 10 | 10 | 10 | 10 | 10 |
| Sage clary oil | 90 | 90 | 90 | 90 | 90 | 90 | 90 | 90 | 90 | 90 |
| Sandela® GD [2] | 7 | 7 | 7 | 7 | 7 | 7 | 7 | 7 | 7 | 7 |
| Vanillin | 1 | 1 | 1 | 1 | 1 | 1 | 1 | 1 | 1 | 1 |
| Versalide® [3] | 10 | 10 | 10 | 10 | 10 | 10 | 10 | 10 | 10 | 10 |
| Vetiver oil bourbon | 20 | 20 | 20 | 20 | 20 | 20 | 20 | 20 | 20 | 20 |
| Material 1 (100% G) | | 20 | | | | | | | | |
| Material 2 (19.9% G) | | | 20 | | | | | | | |
| Material 3 (51.8% G) | | | | 20 | | | | | | |
| Material 4 (40% B) | | | | | 20 | | | | | |
| Material 5 (51.5% G) | | | | | | 20 | | | | |
| Material 6 (65.0% G) | | | | | | | 20 | | | |
| Material 7 (0% G) | | | | | | | | 20 | | |
| Material 8 (0% G) | | | | | | | | | 20 | |
| Material 9 (0% G) | | | | | | | | | | 20 |
| Total | 1,000 | 1,000 | 1,000 | 1,000 | 1,000 | 1,000 | 1,000 | 1,000 | 1,000 | 1,000 |

[1] Registered trademark of Givaudan Corp. for hydroxycitronellal.
[2] Registered trademark of Givaudan Corp. for isocamphyl cyclohexanol.
[3] Registered trademark of Givaudan Corp. for 1,1,4,4,-tetramethyl-6-ethyl-7-acetyl-1,2,3,4-tetrahydronaphthalene.

The cologne base, example 34, during evaporation had a rather harsh top note and dried out woody and thin. Cologne examples 35 and 43 have soft bright top notes and their odors had better balance and bouquet. Upon "drying out" (approximately 12 hours) these two in bouquet and balance is noted. After 12 hours, the bouquet of cologne 38 is still evident but not as outstanding as the colognes 35 and 37. This indicates that mixtures of acetylcedrene containing 40 percent isomer G are essentially the lowest limit for practical fixative properties in these mixtures.

Material 4 may be used in fragrances from 0.1 to 10 percent by weight. However, to realize the best fixative function, it should be used at 2 percent by weight and above.

Material 5 contributes body and a warm woody amber nuance to the cologne, example 39, and is similar to the cologne, of example 38. However, as a fixative it performs more like material 3, example 37. The top notes of the cologne 39 are brighter and as the cologne dries out a definite improvement in bouquet and balance is noted. After 12 hours, the bouquet of cologne 39 is still evident indicating the same fine fixative properties as shown by materials 1, 3 and 9.

Material 5 may be used in fragrances in the same manner as material 3; however, to realize the best fixative function, it should be used at 1 percent by weight and above.

Material 6 contributes a warm woody amber nuance to the cologne, example 40, and is an excellent fixative. The cologne top notes are brighter and the fragrance in general seems better balanced with a pleasant bouquet which remains throughout the dry out of approximately 12 hours.

Material 6 may be used in fragrances from 0.5 to 10 percent by weight. Larger quantities may also be used depending upon the type of fragrance and the effect desired.

The cologne, example 41, containing material 7, is thin and lacks the warmth and body that is exhibited by the colognes containing materials 1, 3, 4, 5 and 6. The acetylcedrene, material 7, contributes a cedar woodiness to the cologne 41 which tends to dilute rather than fortify the fragrance. For this reason, mixtures of acetylcedrene and isomer G, containing less than 40 percent of isomer G, lack outstanding fixative properties. That is, the odor contribution of acetylcedrene dilutes and hinders the odor and fixative properties of isomer G.

Cologne, example 42, containing material 8 is thin and lacks the warmth and body when compared with colognes 35, 37 and 40. This material contributes a light woody note to the cologne and, like acetylcedrene, tends to dilute rather than fortify the fragrance.

The conclusion is drawn that materials 1 and 3 to 6 are fine odorants and valuable perfume materials and can be used to improve and render more desirable many types of fragrances. These materials are novel and excellent fixatives which function in a similar manner to ambergris, but are less expensive and of more stable price than ambergris (gray).

What is claimed is:

1. A process for the isomerization of thujopsene and thujopsene isomers derived from hibawood oil and American cedarwood oil to a mixture comprising substantially $\alpha$-chamigrene, -chamigrene, and novel tricyclic $C_{15}H_{24}$ olefinic hydrocarbons rich in 6,8a-ethanol-1,1,6-trimethyl-1,2,3,5,6,7,8,8a-octahydronaphthalene comprising: reacting thujopsene with a reagent selected from the group comprising strong concentrated protonating acids having a pKa of 4.0 or less and containing less than 50 percent by weight of water, the reaction product being predominantly a mixture of chamigrenes where the pKa is from about 2–4, and predominantly the above novel $C_{15}H_{24}$ hydrocarbon when the pKa is about 0.85 or lower.

2. A process according to claim 1, additionally comprising the use of alkanoic acid containing from two to six carbon atoms utilized in conjunction with said concentrated protonating acid.

3. A process according to claim 1 wherein the acid is selected from the group consisting of formic acid, sulfuric acid, phosphoric acid, polyphosphoric acid and toluene sulfonic acid.

4. A process according to claim 2, wherein the acid mixture consists of a mixture of glacial acetic acid with an acid selected from the group consisting of formic acid, sulfuric acid phosphoric acid, polyphosphoric acid and toluene sulfonic acid.

5. A process for the separation of $\alpha$-cedrene from the hydrocarbon fraction of cedarwood oil which comprises the steps of:
   a. subjecting the said hydrocarbon fraction of cedarwood oil to the process of claim 1, and
   b. separating the $\alpha$-cedrene from the reaction mixture by distillation.

6. A process according to claim 1 for the isomerization of thujopsene and thujopsene isomers derived from hibawood oil and American cedarwood oil into a product comprising substantially tricyclic $C_{15}H_{24}$ olefinic hydrocarbons rich in 6,8-ethano-1,1,6-trimethyl-1,2,3,5,6,7,8,8a-octa-hydronaphthalene which comprises utilizing acids having a pKa of 0.85 or less as the acid reagent.

7. 6,8a-ethano-1,1,6-trimethyl-1,2,3,5,6,7,8,8a-octahydronaphthalene.

8. A process according to claim 1, wherein perchloric acid is the acid employed in an amount from about 15 to about 50 mole percent relative to thujopsene.

9. A process according to claim 1, wherein perchloric acid is the acid employed in an amount from about 5 to about 25 weight percent based on the total weight of acid and thujopsene.

10. A process according to claim 8, wherein the amount of perchloric acid employed is from about 45 to about 65 mole percent relative to thujopsene.

* * * * *